United States Patent
Eriksson et al.

(10) Patent No.: US 7,230,921 B2
(45) Date of Patent: Jun. 12, 2007

(54) CONCURRENT USE OF COMMUNICATION PATHS IN A MULTI-PATH ACCESS LINK TO AN IP NETWORK

(75) Inventors: Goran A. P. Eriksson, Sundbyberg (SE); Michael Eriksson, Sollentuna (SE); Tony Jokikyyny, Espoo (FI); Jukka Ylitalo, Espoo (FI); Mikael X. Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1182 days.

(21) Appl. No.: 10/106,861

(22) Filed: Mar. 26, 2002

(65) Prior Publication Data

US 2002/0141393 A1    Oct. 3, 2002

Related U.S. Application Data

(60) Provisional application No. 60/280,919, filed on Apr. 2, 2001.

(51) Int. Cl.
*H04L 5/00* (2006.01)
*H04J 3/22* (2006.01)

(52) U.S. Cl. .................. 370/230; 370/238; 370/466

(58) Field of Classification Search ............... None
See application file for complete search history.

(56) References Cited

U.S. PATENT DOCUMENTS 5,680,400 A    10/1997    York 6,396,833 B1 *   5/2002   Zhang et al. ............... 370/392
6,819,655 B1 *  11/2004   Gregson ..................... 370/242
6,950,657 B1 *   9/2005   Hiller et al. ................ 455/445

FOREIGN PATENT DOCUMENTS

| EP | 1 067 746 | 1/2001 |
|---|---|---|
| WO | 00/19679 | 4/2000 |
| WO | 00/67435 | 11/2000 |
| WO | 01/47229 | 6/2001 |

OTHER PUBLICATIONS

Arango M.: "Guaranteed Internet Bandwidth", Phoenix, May 4-7, 1997, New York, IEEE, US, vol. Conf. 47, Nov. 18, 1996, pp. 862-866, XP000741554, ISBN: 0-7803-3660-7 *the whole document*.

"Method for Accessing the Internet Using Multiple Telephone Lines", IBM Technical Disclosuer Bulletin, US, IBM Corp., New York, vol. 41, No. 1, 1998, pp. 153-155, XP000772059, ISSN: 0018-8689 *the whole document*.

(Continued)

*Primary Examiner*—Doris H. To
*Assistant Examiner*—Soon D. Hyun

(57) ABSTRACT

In conducting a communication session via an IP-based communication network, where access to the communication network can be obtained via a plurality of bearers (11, 13, 15), a plurality of packet flows associated with a communication application (47) can be routed on respective ones of the bearers simultaneously.

66 Claims, 15 Drawing Sheets

OTHER PUBLICATIONS

Maltz, David A., et al: MSOCKS: An Architecture for Transport Layer Mobility, IEEE Infocom 1998.

Lindberg, Niclas, et al.; Communication System and Method Therein; U.S. Appl. No. 09/742,282 filed Dec. 22, 1999.

Eriksson, Goran A.P.; Access Point Discovery and Selection; U.S. Appl. No. 09/986,417 filed Nov. 13, 2000.

El-Malki, Karim; Hierarchical Mobility Management for Wireless Networks; U.S. Appl. No. 09/784,072 filed Feb. 16, 2001.

Perkins, Charles E: "Mobile IP", IEEE Communications Magazine, IEEE Service Center, Piscataway, N.J., US, vol. 35, No. 5, May 1, 1997, XP000657114, ISSN: 0163-6804.

* cited by examiner

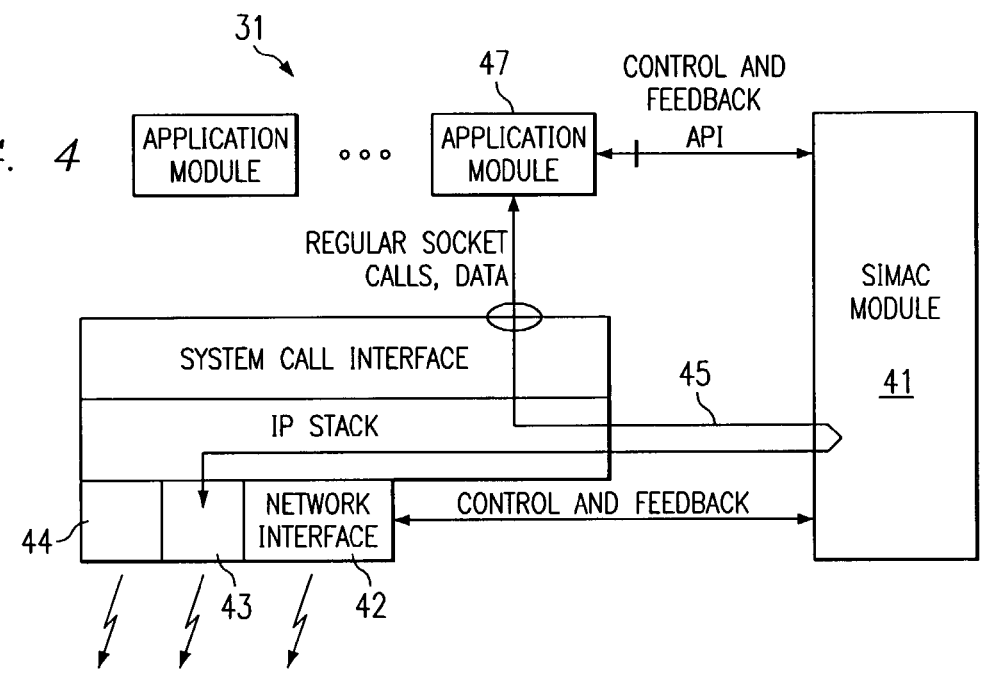
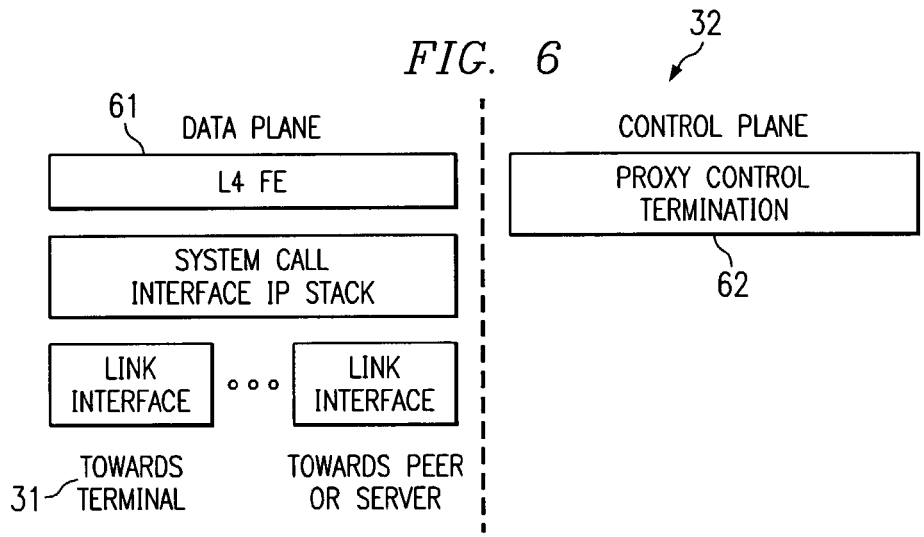
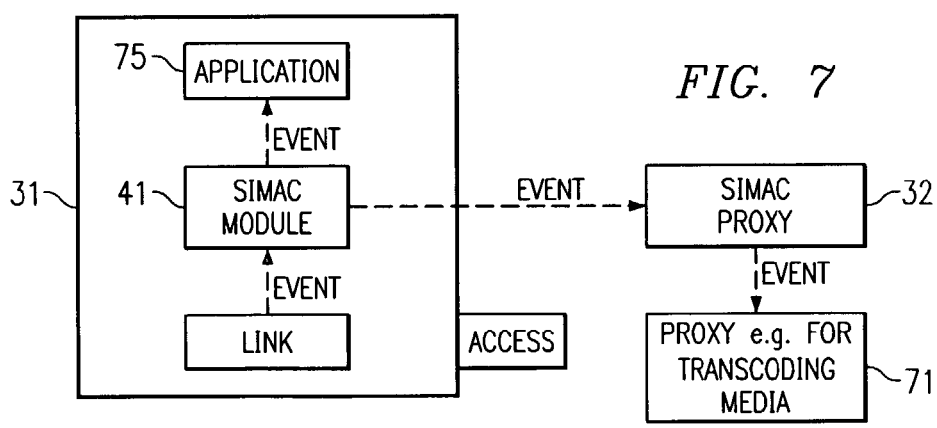

FIG. 7A
```
//Distribute information about event
Inform <external entity address> about <event> when <event criteria>
append <payload>
The parameters can have the following values:
<external entity address>   E.g. IP address and port, URL.
<event>                     [Reception of this message, change in routing
                            of packet flows, other-ffs].
<event criteria>
```
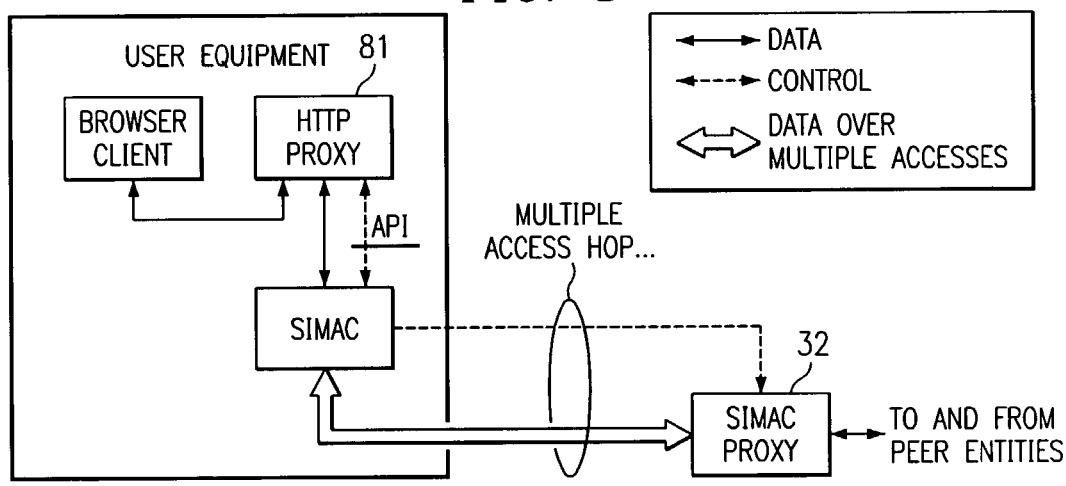
FIG. 8
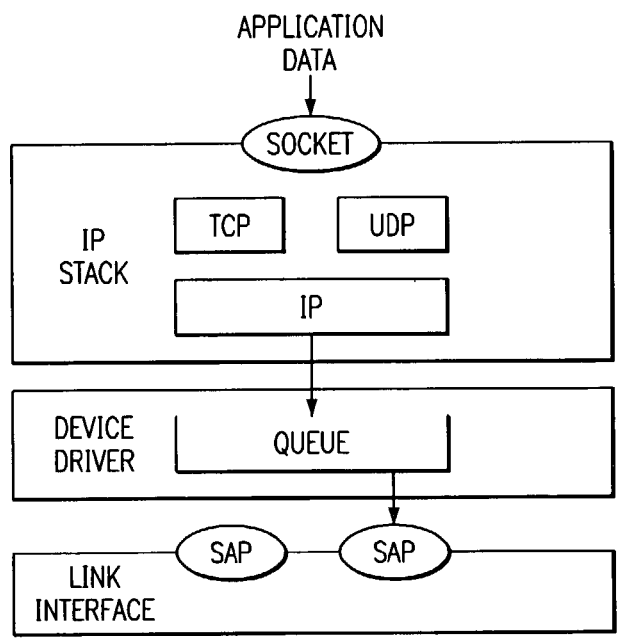
FIG. 9 (PRIOR ART)

FIG. 10
FLOW ID TABLE

| APPLICATION PACKET FLOW IDENTIFIERS | IDENTIFICATION |
|---|---|
| <packet flow ID> | <COMBINATION OF INFORMATION IN IP TRANSPORT AND/OR NETWORK HEADER, e.g. IP ADDRESS, PORT NUMBER(S), flowID (IPv6), OPTIONAL HEADER (IPv6) IPSec SPI, DS TAG, ETC> |

FIG. 11
ROUTING TABLE IN L4FE,

| FLOW IDENTITY | ROUTE DOWNLINK | ROUTE UPLINK |
|---|---|---|
| <PACKET FLOW ID> | 1<TRANSPORT CHANNEL ID><br>2<TRANSPORT CHANNEL ID> | 1<TRANSPORT CHANNEL ID> |

FIG. 12
TABLE FOR DEFINING TRANSPORT CHANNELS

| TRANSPORT CHANNEL IDENTIFIERS | DESCRIPTION AND CONFIGURATION | OPTIONS |
|---|---|---|
| <TRANSPORT CHANNEL ID> | <DESTINATION ADDRESS><br><OTHER CHANNEL CONFIGURATION INFORMATION><br>    <TYPE><br>    <TUNNEL TYPE><br>    <TUNNEL COMPR><br>    <TUNNEL ENCR> | [IP ADDRESS, PORT, ETC]<br>[e.g. BANDWIDTH]<br><br>[RAW, TUNNEL]<br>[IPinIP, IPin UDP,...]<br>[YES/NO, TYPE]<br>[YES/NO, TYPE, INFORMATION] |

LINK LAYER BEARER CONFIGURATION TABLE

| LINK IDENTIFIER | BEARER IDENTIFIER | CONFIGURATION DATA |
|---|---|---|
| <umts_0> | umts_ic_1<br>umts_ic_2 | <bw,prio,etc><br><...> |
| Eth_0 | eth_0 | <...> |

TABLE FOR ASSOCIATING TRANSPORT CHANNELS WITH LINK BEARERS

| TRANSPORT CHANNEL | INTERFACE | DRIVER QUEUE |
|---|---|---|
| <transport channel id> | <umts_0> | <umts_1> |

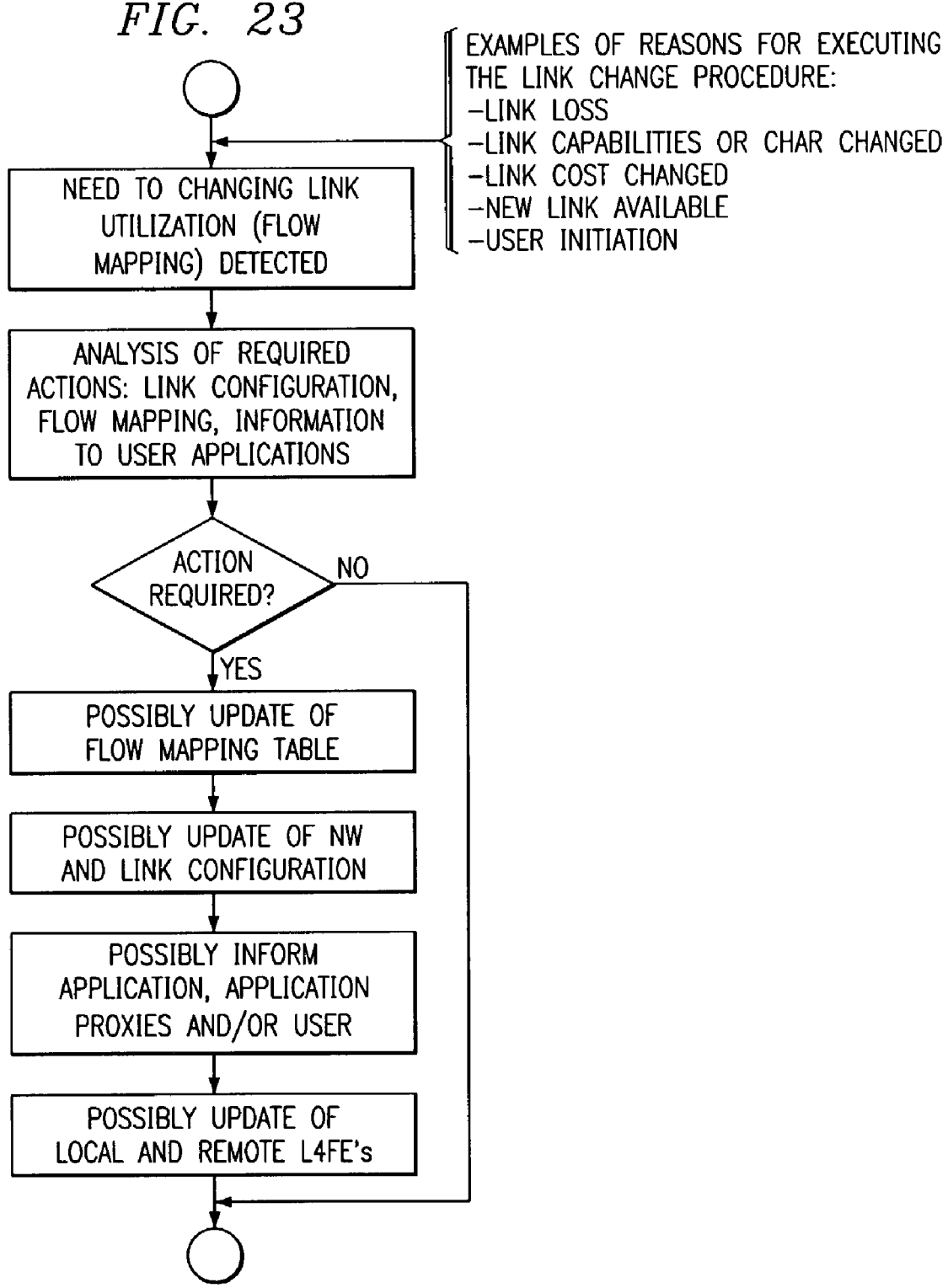

CONCURRENT USE OF COMMUNICATION PATHS IN A MULTI-PATH ACCESS LINK TO AN IP NETWORK

This application claims the priority under 35 U.S.C. 119(e)(1) of copending U.S. provisional application Ser. No. 60/280,919 filed on Apr. 2, 2001 and incorporated herein by reference.

FIELD OF INVENTION

The invention relates generally to digital communication and, more particularly, to IP-based communications.

BACKGROUND OF THE INVENTION

Connectivity to networks that utilize Internet Protocols is widely available, and the opportunities for such connectivity continue to increase, in particular with introduction of more and more wireless access technologies. At any given time, a user of a communication terminal may be able to use several different methods to access an IP-network, for example UMTS, wireless LAN (WLAN), Bluetooth, infrared IrDA or fixed Ethernet.

The number of available access methods may remain constant if the user's communication terminal is stationary, whereas the number of available access methods could change with physical movement of the communication terminal from one location to another.

Access methods such as the examples given above can differ in many aspects, for example, bandwidth, latency, reliability, power consumption, coverage, packet loss and prices for usage. As in shown in FIG. 1A, in IP-communications, two applications use lower layer transport services for communicating, accessed via so called 'sockets'. The requirement on the transport from one application to another can vary considerably, and may depend on e.g. user expectations, size of data to be transported, format of data to be transported, etc.

Given a situation where the provided transport service available via sockets varies a lot, as discussed above, it follows that mapping of application flows onto lower layer services can be important, as well as management of changes in the available transport.

It is therefore desirable to provide for prudent utilization of the transport, in particular access, services available for supporting communication between two IP- end-points.

The present invention provides for a communication terminal to perform IP-based communications using multiple access methods concurrently for respective packet flows of one or more communicating applications, including managing changes in available transport capabilities, e.g. due to mobility. In exemplary embodiments, The invention allows for: simultaneous mapping of information flows in up- and down link, onto one or several tunnels, which may be associated to a link interface or to a bearer on a link interface, considering requirements of flow and capabilities and characteristics of the tunnel; management of link change due to, but not limited to, movement of the terminal, the management mechanism providing support for remapping flow(s) onto another tunnel (interface or transport channel) in up- and down link and provisioning of information about the change to higher layers and/or the user about the change; framework for adaptation of information flows which may be necessary in conjunction with remapping of flows due to link change; analysis of information flows to implicitly determine optimal access utilization and possibly rearrangement of information flow structure, to allow for split over different tunnels; interaction between the user and application(s) generating information flows to be transported and the mechanisms described above, including but not limited to configuration files, policies, and method calls in API's for interaction in real time; interaction with lower layers to detect a need for rearranging the mapping of information flows; and a 3rd party influencing the mapping (placement and movement) of information flows via policies.

BRIEF DESCRIPTION OF THE DRAWINGS

FIG. 4 diagrammatically illustrates pertinent portions of exemplary embodiments of one of the communication terminals of FIG. 3.

FIG. 6 diagrammatically illustrates exemplary embodiments of the SIMAC proxy of FIG. 3.

FIGS. 7 and 7A diagrammatically illustrate exemplary embodiments of the invention including an optimization function proxy.

FIG. 8 diagrammatically illustrates further exemplary embodiments of the invention including an application proxy.

FIG. 9 illustrates a conventional example of transport from an application in an IP-based system.

FIGS. 10–12 illustrate exemplary tables which can be used by the layer 4 forwarding engines of FIGS. 5 and 6.

FIG. 23 illustrates exemplary operations for effectuating flow re-mapping according to the invention.

DETAILED DESCRIPTION

Figure 1:
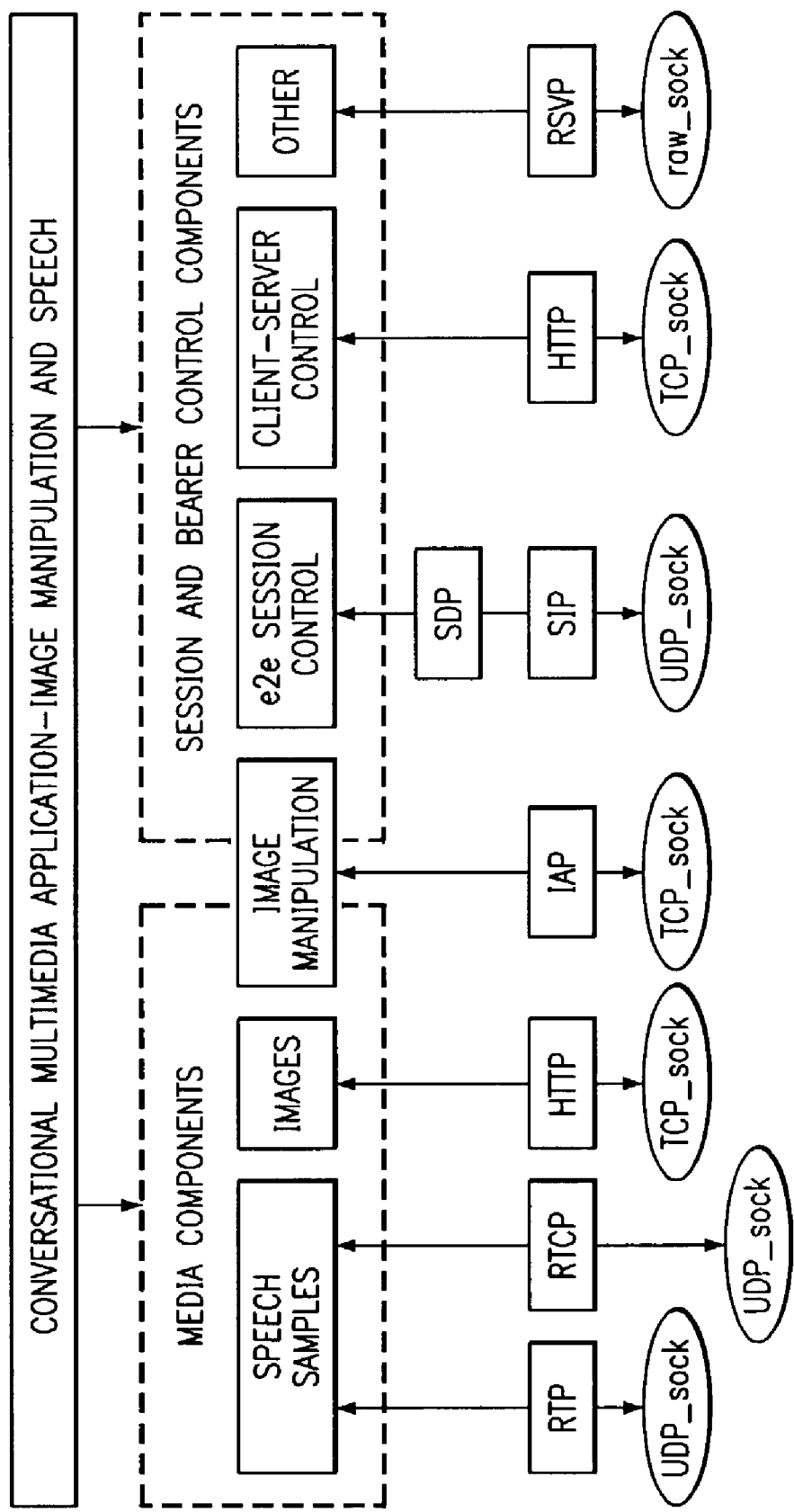
FIG. 1 diagrammatically illustrates exemplary application packet flows from/to a user's communication terminal for a conversational multimedia application.
Figure 1A:
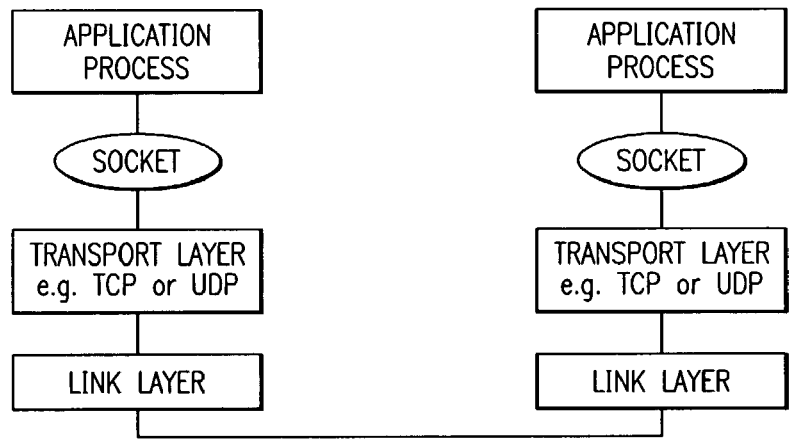
FIG. 1A illustrates IP communications between applications.

The present invention recognizes that selecting the access method need not be an either/or choice. Rather, it would be advantageous if the user could utilise multiple access technologies concurrently. In some embodiments of the invention, the multiple access management is flexible enough to permit different packet flows of the same session to use different access methods. For example, a video media flow could switch to Bluetooth when available, while the audio media flow and associated signaling flow could use UMTS transport services throughout the session, for example, because of better area coverage provided by UMTS access technologies. In general, the invention permits packet flows with different characteristics, and consequently different requirements on transport service, to use the appropriate access technologies depending on the properties of the available access technologies and the behavioral requirements of the individual packet flows.

According to exemplary embodiments of the present invention, at any given point in space, IP-based applications can benefit from the availability of several transport alternatives for a certain hop. In some embodiments, the hop is the first link, a.k.a. 'access', as seen from the IP-host. The invention permits multiple packet flows to and from a given application to utilize multiple accesses simultaneously. This concept is also referred to Simultaneous Multiple Access, or SIMAC. Thus, SIMAC relates to simultaneous usage of a plurality of different access interfaces through which a user's communication terminal can transmit and receive a plurality of respective packet flows. According to some embodiments of the invention, a plurality of packet flows, which respectively utilize a plurality of access interfaces or associated bearers, may all be associated with a single communications application, transparent to other end-systems.

The SIMAC feature can be said to create 'virtual' IP bearers spanning several transport (access) technologies. SIMAC can incorporate interaction with the application layer and the link layer (in addition to the transport and network layer), thereby better facilitating development of applications designed to cater to changes in available transport capabilities.

SIMAC can be invoked on a per session basis in some embodiments, and can also support a situation in which only one access is user by the user's terminal or the user's application at any given moment. For each application, profiles can be created to indicate how the available accesses should be used, a.k.a. preferences. A user, or an external party such as a service provider, may set a profile with access preferences associated to a specific application and/or the SIMAC functionality itself.

In some embodiments, the SIMAC feature can be combined with other support functions, for example media transcoding functions, in order to support adaptation of the application flows to changes in the available transport capabilities that is not transparent to the application flow, for example when transferring from e.g. Ethernet to a specific bearer on a UMTS link.

FIG. 1 illustrates exemplary application packet flows from/to a user terminal for a conversational multimedia application that includes speech, images, image manipulation and control signalling. As shown in FIG. 1, each part of the application generates one or more packet flows, each packet flow having its own requirements with respect to bearer (transport) characteristics.

Figure 1B:
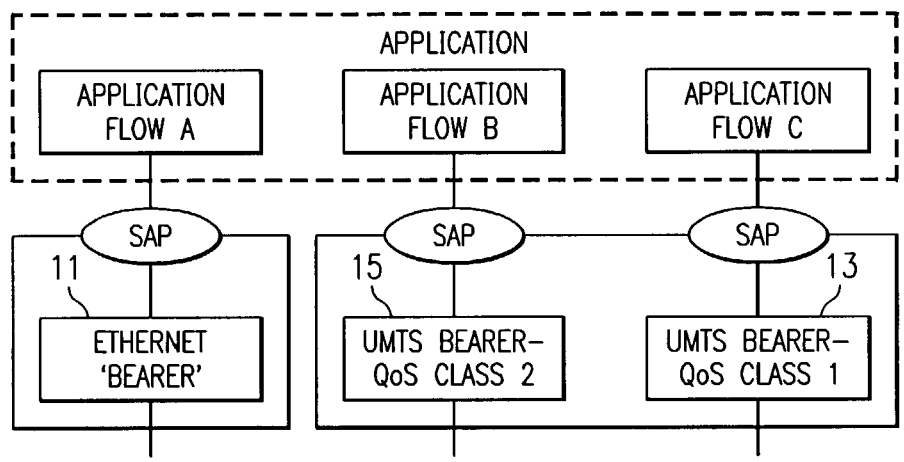
FIG. 1B shows an example of mapping application flows onto interfaces via Service Access Points.

FIG. 1B shows an example of how application flows are mapped onto, in this example, either an Ethernet interface or a UMTS interface via Service Access Points, SAP's. Note that on the UMTS interface, there is more than one 'bearer' with different quality of service QoS provided by each bearer 13 and 15. Consequently, when deciding the mapping of application packet flows, it is not sufficient to select an interface. A suitable process for mapping packet flows must also consider individual bearers. To conclude: some access technologies support several bearer (transport) services with respectively different quality-of-service levels, while other access technologies only support a single bearer service. The general solution thus needs to consider bearers, while the case where there is a one-to-one relationship between the interface and the number of bearers, for example the Ethernet bearer 11 of FIG. 1B, is a special case.

As mentioned above, different access technologies have different benefits. A typical benefit trade-off situation is exemplified by a high throughput technology, such as WLAN versus a wide-area coverage at lower throughput technology, such as cellular access.

On a per-application flow basis, SIMAC maps uplink and downlink flows onto available transport, accesses, and, if applicable access bearer in any given moment. SIMAC can dynamically adapt to changes in (access) transport capabilities, e.g. by changing the way application flows are mapped onto access bearers, or by changing the bearer configuration.

In some embodiments, SIMAC can provide support for adaptations of the application(s), primarily by informing the application(s) about changes in the transport service provided, e.g. upcoming or already implemented, or by invoking media optimization functions, such as transcoders, automatically.

Some embodiments include support for implicitly deducing application requirements regarding how to use and configure the available bearers and how to possibly re-configure the flows from the application to better allow for more efficient utilization of the capabilities offered by a multiple access situation. Such a solution is applicable, for example, in the case that the application has no explicit interaction with the SIMAC functionality. There is still the possibility that the user may indicate his preferences via configuration data.

Various SIMAC embodiments can include the following exemplary functionality: information gathering about (access) transport capabilities available to the user information, including anticipation of future situations; information gathering about application requirements, including user preferences and policies (such as cost) set by service providers; selecting a preferred mapping of traffic flows onto bearers and configuration of transport bearers to fulfill the desired operational requirements given the available capabilities at any moment in time (optimization functions are considered in some embodiments when selecting the preferred configuration); configuring user plane routing mechanisms in uplink and downlink; bearer configuration; optimization functions; and in some cases encapsulation of the traffic flows in IP tunnels for uplink and downlink.

In some IP tunneling embodiments, an IP address is associated with each access type, and in some cases IP addresses are associated with individual bearers within an access type, e.g. UMTS. Using tunneling techniques, this is hidden from the application and the peer and servers with which the application communicates. Tunneling solutions used in available techniques, e.g. Mobile IP. In the context of the SIMAC solution, the tunnels are not associated to interfaces only, but rather to individual bearers on interfaces (access). Also in the SIMAC context, the tunnels are not only of IP in IP, but can also be of other types.

One basic problem to solve is that there is a hop between the two user terminals, and there are at least two alternatives (paths) for traversing the hop. A likely scenario is that the hop is the first, i.e. the access link from e.g. a user terminal to the first router. In any embodiment, there must be functionality in each side of the multi-path link, managing the mapping of flows onto the different bearers on each alternate path—this functionality is referred to herein as a Forwarding Engine. In addition, control intelligence for managing the two Forwarding Engines (one on each side of the hop or link) is needed. There are several alternatives for embodiments of Forwarding Engines and associated control logic.

Figure 3:
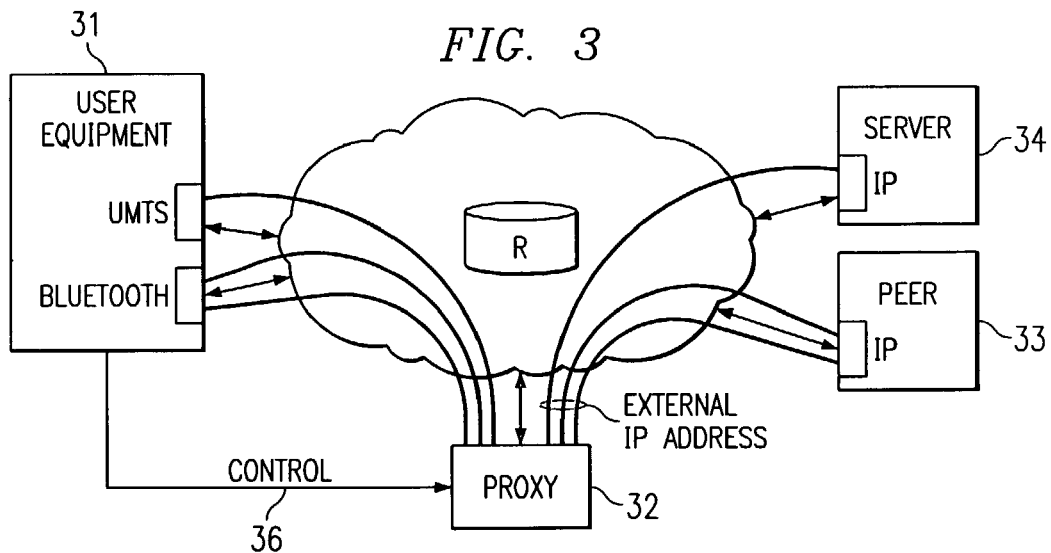
FIG. 3 diagrammatically illustrates another exemplary embodiment of the invention for supporting the communication illustrated in FIG. 1, wherein one of the routing functions of FIG. 2 is collocated with the communication terminal of one of the users.

Some exemplary SIMAC embodiments implement two user plane forwarding functions, which map IP packets onto different bearers. The forwarding functions are provided on each side of the link (for which there are multiple alternate paths), and there are several available implementation alternatives for the forwarding functions. In some embodiments the forwarding functions can be integrated in the end-systems which host the applications, e.g. the user communication terminals, or they can be put in separate, stand-alone entities provided between the end-systems. In the example of FIG. 3 there is a mixed situation, where one of the forwarding engines is integrated in a user communication terminal 31, while the other is in a stand-alone entity, in this context denoted a SIMAC proxy 32.

The control logic includes a central intelligence, herein called a Link Manager. An exemplary Link Manager function is to build the tables according to which the Forwarding Engines forward packets onto different bearers. For example, information about how to map a particular application flow onto a bearer is provided to the Forwarding Engines, where it is stored in tables called 'routing tables' or 'forwarding tables'. The Link Manager maintains information about how different application flows are mapped onto bearers, information about how the bearers are configured, and information about the load on the bearers (since it has knowledge about how many flows it has put on a bearer). The aforementioned information is gathered by the Link Manager in a flow-mapping table. The Link Manager also keeps track of if and how applications shall be informed about changes in the service that can be provided to the application, e.g. due to loss of a link or degradation of service obtained on a particular bearer on a link. In building the flow mapping table, the Link Manager can, for example, use information about:

a) Link availability, and availability, capability and characteristics of bearers on links;
b) Preferences of a user or external party, such as a service provider, as to how the SIMAC function should operate;
c) Application requirements and application specific preferences regarding SIMAC operation. The preferences can be seen as delimiters and default settings. They may be provided during initialisation of an application. The application may also provide instantaneous requirements on the SIMAC service, complementing or overriding the information provided by the preferences.

Another exemplary function of the Link Manager is managing the configuration of link layer and IP-layer functions.

In some embodiments, the forwarding functions (e.g., Forwarding Engines) are implemented in stand-alone proxies, SIMAC-proxies, that are configured by the Link Manager via a control protocol. Such stand-alone proxies with Forwarding Engines can be placed where desired in the network (as long as they are on each side of the multi-path hop).

Figure 2:
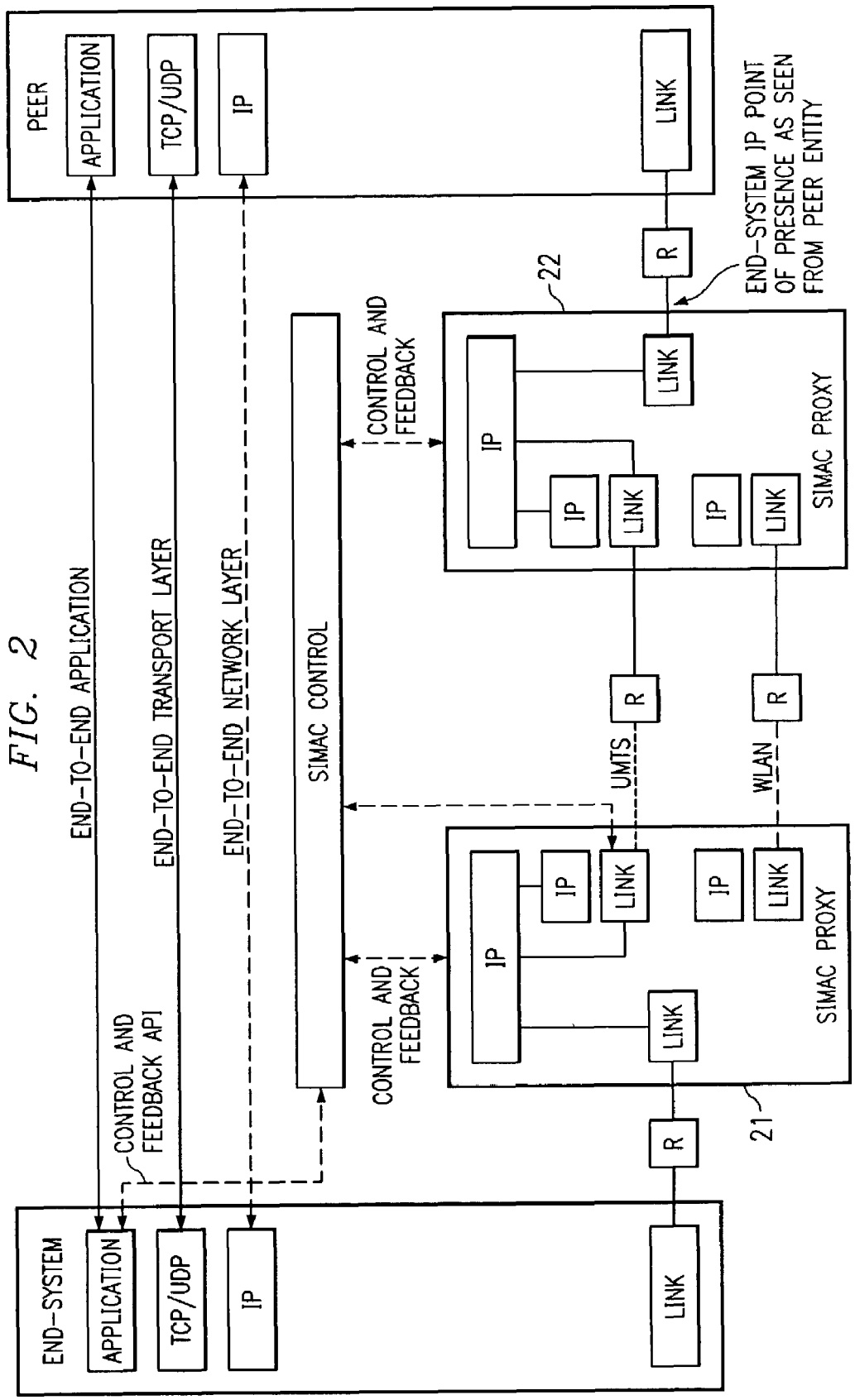
FIG. 2 diagrammatically illustrates a functional architecture associated with exemplary embodiments of the invention.

FIG. 2 diagrammatically illustrates exemplary embodiments of the invention. Some embodiments include two stand-alone forwarding proxies 21 and 22, one on either side of a multi-path link between a pair of end-systems, for example the respective communication terminals of first and second users engaged in the type of conversational multi-media communication illustrated in FIG. 1. In other embodiments, the forwarding proxy 21 can be collocated with the user equipment hosting the application (i.e. an end-system of FIG. 2), either integrated with the user equipment, or provided in another physical device carried along by the user together with the 'user equipment'.

FIG. 3 diagrammatically illustrates exemplary embodiments of the invention wherein one of the forwarding proxies is provided as a stand-alone proxy 32, a SIMAC proxy, in the network, and the other forwarding function is integrated with the Link Manager in the user equipment device 31. The proxy 32 routes downlink traffic to user equipment 31 based on information received from the user equipment 31. SIMAC functionality management in embodiments wherein one forwarding proxy is collocated or integrated with the user equipment can be more complex than in embodiments wherein both forwarding proxies are stationary stand-alone network proxies, because the transport capabilities available to the user application in collocated/integrated embodiments can vary e.g. if the user equipment moves. On the other hand, the available transport capabilities are essentially static when both forwarding functions are provided in stationary proxies in the network. It can therefore be seen that SIMAC management/selection operations associated with stationary proxies would represent a subset of the SIMAC management/operations associated with the aforementioned collocated/integrated embodiments.

The exemplary communication terminal 31 in FIG. 3 includes a UMTS interface and a Bluetooth interface. The communication terminal 31 can use both of the interfaces simultaneously, for example on a per session basis, to communicate via the proxy 32 with a peer device 33 and a content server 34. Examples of the communication terminal (user equipment) 31 include mobile telecommunications terminals such as cellular telephones.

FIG. 4 diagrammatically illustrates pertinent portions of exemplary embodiments of the communication terminal 31 of FIG. 3. The functionality related to SIMAC collocated/integrated with the user equipment hosting the application(s) is denoted SIMAC module at 41. The SIMAC module 41 is coupled for control signalling with a plurality of application modules, and also coupled for control signalling with a plurality of network interfaces 42, 43 and 44. The SIMAC module may also be coupled with functions on the transport and network layers via network interfaces. The SIMAC module 41 is also included in a data communication path structure 45, a.k.a. 'user plane', between the application and the network interfaces 42–44.

Figure 5:
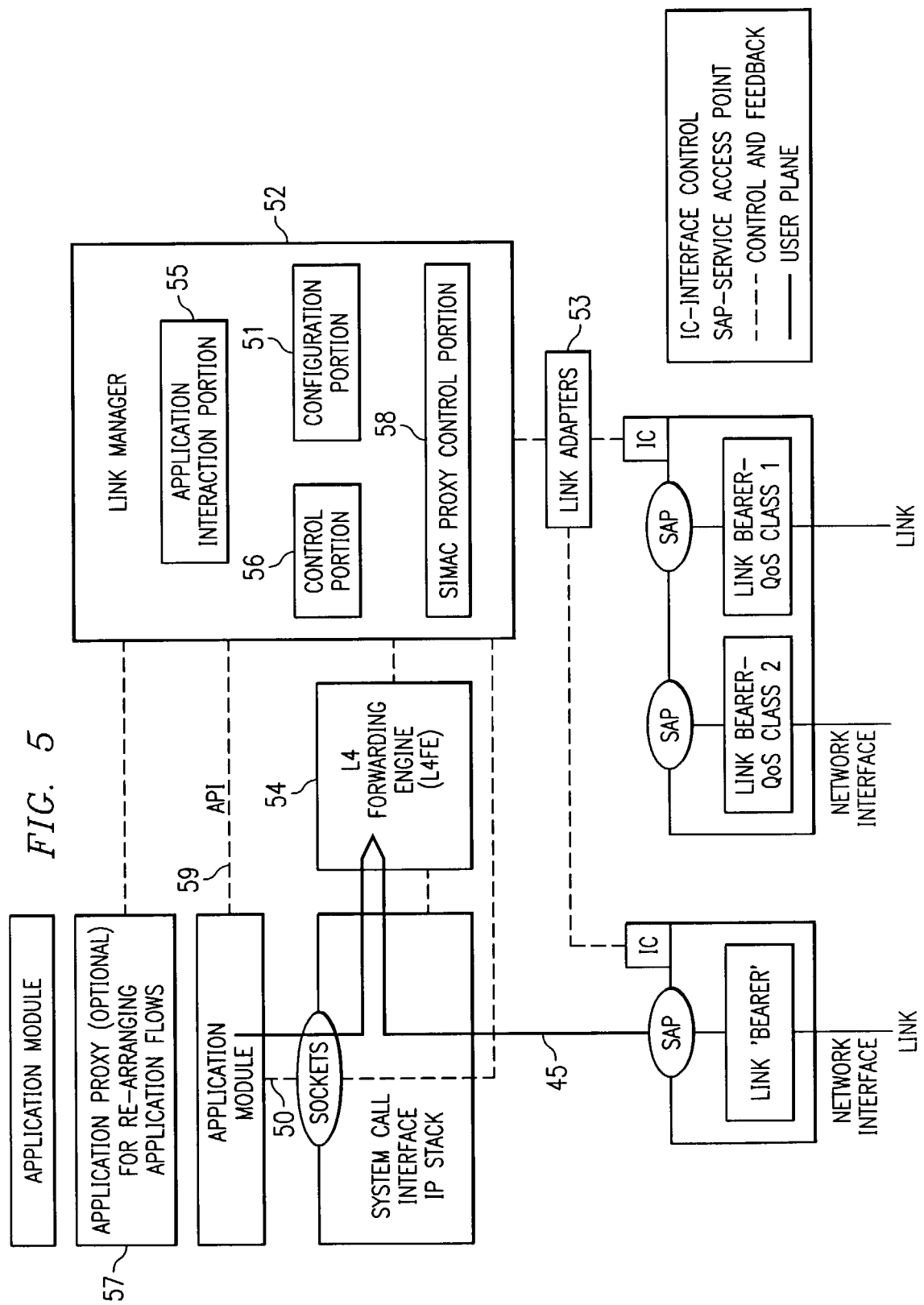
FIG. 5 diagrammatically illustrates exemplary embodiments of the SIMAC module of FIG. 4.

FIG. 5 diagrammatically illustrates exemplary embodiments of the SIMAC module 41 of FIG. 4. In FIG. 5, the SIMAC module includes a Link Manager 52, link adapters 53, and a layer 4 (L4) forwarding engine 54. The Link Manager 52 includes a configuration portion 51, a control portion 56, and a SIMAC Proxy control portion 58. In some exemplary embodiments, the SIMAC module can also include an application interaction portion 55, seen as a part of Link Manager 52, and/or an application proxy 57 for e.g. optimizations of application flow structure by re-arrangements, i.e. splitting or multiplexing application flows onto sockets. The link manager 52 controls the application proxy 57.

During uplink communications, the forwarding engine 54 intercepts the outgoing IP packets in the kernel (in cooperation with the IP stack), and uses forwarding rules to map the packet flows onto appropriate network interfaces, or onto appropriate network interface bearers via associated SAPs in FIG. 5.

More specifically, each packet flow is mapped onto a transport channel, a transport channel being an abstraction of a specific path over a particular bearer on a particular network interface (link). The transport channel can be of difference types, either 'raw' in which case the IP packet from the socket is sent 'as is' on the associated bearer, or 'tunnelled', in which case the IP packet from the socket is encapsulated in an IP transport protocol appropriate for the situation, such as IPinUP, IPinUDP, etc. The mapping of flows onto transport channels, and the association of transport channels to bearers can be controlled by the Link Manager.

The forwarding engine 54 can, for example, forward the packets onto appropriate transport channels according to routing tables whose contents are defined and provided by the link manager 52. The forwarding can be done based upon information in IP (transport and network) headers, for example flow ID, IP destination and source addresses, IPSec SPI, etc. This process is often denoted 'flow classification'. In some embodiments, the forwarding engine implements an IP-tunneling technique for a tunneled transport channel, adding IP tunneling headers during uplink (and symmetrically, a forwarding engine on the remote side of the multipath link would do the same on down link for a tunneled transport channel.) During downlink, the forwarding engine 54 receives the incoming flows and forwards them to the appropriate socket. During downlink in IP tunneling embodiments, the forwarding engine 54 removes the tunneling IP headers that were added by the SIMAC proxy 32 (see also FIG. 3).

The link manager 52 makes the flow mapping decisions, namely which transport channels, and associated (access) bearers will be used for a particular application flow. The link manager makes the flow mapping decision based e.g. upon information received from link adapters 53, and intrinsic knowledge about expected behaviour of access technologies. The link adapters 53 provide a generic interface toward different link layer devices, e.g., network interfaces, and abstract the actual interface in order to provide the link manager with information about the availability and capabilities of the bearers on the various accesses (e.g. UMTS or Bluetooth). The link manager 52 maintains knowledge of momentarily available accesses and associated bearer transport capabilities and characteristics configuration information, that is, which accesses and bearers are available at any given moment. The Link Manager also decides how the available access bearers should be used for uplink traffic and/or downlink traffic. The link manager also decides what type of transport channel is to be used for a particular bearer. In the process of deciding how to map application flows onto transport channels and transport channels onto bearers, the link manager 52 can also initiate the appropriate configuration of the network interface, via link adapter 53, which interacts with the network interface's 'Interface-Control' (IC) API if applicable to the access technology. Link Manager 52 also initiates configuration of transport and network functions, if applicable, e.g. Mobile IP signaling, and configuration of SIMAC proxy 32 in FIG. 3 using SIMAC Proxy control portion 58 in FIG. 5.

In some embodiments, the link manager 52 may decide to use triangular (asymmetrical) routing, meaning that uplink and downlink packets from the same application flow (having the same flow identity) are routed through different transport channels. In some embodiments, the routing mapping decisions of the link manager 52 are based at least in part on information indicative of user or external party preferences about, for example, cost minimization, secure access, etc. Such preference information can be provided via configuration information in configuration portion 51 of FIG. 5. The configuration portion 51 can also include storage facilities for storing therein a configuration file, which includes information indicative of a user's and/or an external party's preferences or policies.

In some embodiments, the link manager 52 can include logic for implicitly deducing flow requirements and choosing the appropriate mapping of the flow onto transport channel, transport channel type and appropriate (access) bearer and bearer configuration accordingly. In some embodiments, the link manager 52 may decide that it would be beneficial to re-configure the structure of the applications flow, or flows, and in co-operation with an application proxy 57 in FIG. 5, perform such an operation. In other embodiments, the link manager 52 can include logic to predict changes in transport (access) capabilities and/or characteristics and prepare for such events. For example, the link manager 52 may detect e.g. using information from the network interfaces and/or link adapters that the user equipment is getting close to a cell border of a wide area radio transport technology (for example, HiperLAN2), which indicates that the access may soon be lost. The link manager 52 can accordingly arrange for another access technology, for example a suitable bearer on a UMTS access, to take over the traffic, and can suitably modify transport channels and the routing table of the layer 4 forwarding engine 54, together with configuration of the selected UMTS bearer.

Some exemplary embodiments include the aforementioned application interaction portion 55, a part of the link manager 52, to provide functionality for explicit interaction with applications that are adapted to a multiple access environment. The application interaction portion 55 supports an API for this interaction. It can provide the application with feedback about changes in the provided transport service, e.g. as a results of a loss of a link, which permits the application to adapt to the situation. The API of the application interaction portion 55 can also support requests for transport, requests for information about available (access) bearer transport capabilities and/or characteristics, invocation of optimization proxies, and indication of user preferences. The application obtains from application interaction portion 55 information such as results of requests, changes in the available (access) bearer transport capabilities and/or characteristics, etc.

The API used by applications to interact with the link manager 52 can be implemented in different manners. In some embodiments shown by FIG. 5, the API is partly implemented by re-using some of the standard socket methods (at 50) and in parallel using a separate interface (at 59). The socket used at 50 could be e.g. INET type, or could follow the WINSOCK2 standard.

FIG. 6 diagrammatically illustrates exemplary embodiments of the SIMAC proxy of FIG. 3. In FIG. 6 the SIMAC proxy includes a layer 4 forwarding engine 61 generally analogous to the layer 4 forwarding engine 54 of FIG. 5. The forwarding engine 61 maps uplink and downlink traffic relative to appropriate transport channels according to a forwarding table defined, for example, by the link manager 52 of FIG. 5. The forwarding engine can map downlink flows such that the SIMAC operation is transparent to the peer device 33 (as well as to server 34) of FIG. 3. The SIMAC proxy also includes a proxy control termination portion 62 which receives control information, for example from terminal 31 of FIG. 3 using SIMAC proxy control portion 58 of FIG. 5. For example, the proxy control termination portion 62 can appropriately configure the forwarding tables of the layer 4 forwarding engine 61 in response to information received from the SIMAC proxy control portion 58 of FIG. 5. Such changes can for example concern which transport channel to use for a specific application flow, the configuration of the transport channel, and which bearer the transport channel is associated with. The proxy control termination portion 62 can, in some embodiments, provide feedback information to the terminal 31.

In embodiments that utilize IP tunneling, the layer 4 forwarding engine 61 can add tunneling IP headers in downlink towards terminal 31 as appropriate.

The user terminal 31 of FIG. 3 can identify available SIMAC proxies in the network using conventional methods, for example reading the information from a configuration file, broadcasting a service request and receiving the information in a response thereto, or querying an entity in the network that provides such information upon request.

The link manager 52 of user terminal 31 of FIG. 3 can configure the forwarding engine 61 of the SIMAC proxy 32 using a proxy control protocol over a link as illustrated at 36 in FIG. 3. The link at 36 can be, for example, a cellular link. The proxy control protocol permits the link manager 52 to configure the layer 4 forwarding engine 61 for the desired routing action, e.g. how application flows are mapped onto transport channels, similar to the layer 4 forwarding engine 54 in FIG. 5. This can include setting a default routing table that indicates which transport channel to take for a flow, the type of transport channel-IP tunneling or not, and association of transport channel to link layer bearer. The link manager 52 can also provide to the SIMAC proxy 32 instructions regarding other actions to take e.g. at link failure.

Changes in transport capabilities and/or characteristics cannot, and should not, always be hidden from the application, and its user. For example, if the application includes a media stream (such as a video stream) that consumes a large amount of bandwidth, more than the available transport can provide support for, the application may want to manage this situation. Exemplary approaches would be to drop the whole application session, or only the media stream, while keeping other application flows, or freeze the picture while displaying an error message such as "signal lost". Another approach would be to change the format of the session, for example changing the coding of the video samples to a format suitable to the available transport (bearer) characteristics and/or capabilities, e.g. a format requiring less bandwidth. There are several schemes available for adapting media to different transport capabilities, for example: using MPEG7 techniques, such as "spot of interest" techniques; invocation of compression; and layered coding of streaming video. Functions such as these can be performed in the application itself, but can also be located in proxies, such as network proxies, for example transcoders proxies in the network. Such performance enhancing functions can be provided in both uplink and downlink. Such functions can in some embodiments be placed in application proxy portion 57 of FIG. 5 in the user equipment, or in proxy portion 71 of FIG. 7. The optimizations are not necessarily symmetric.

In some embodiments, and as mentioned above, the SIMAC module 41 can inform the application about changes in transport capabilities or characteristics, information which has been requested by the application via the interaction API. The SIMAC module may also have performed automatic reconfiguration of link, and bearer, utilization. In such some embodiments, it is up to the application to adapt to the new situation. Some exemplary alternatives available to the application include negotiating a change with the peer entity (see 33 and 34 in FIG. 3) or invoking a transcoder proxy, or any other type of appropriate performance enhancing proxy.

In other embodiments, the SIMAC module 41 can itself trigger invocation of uplink and downlink optimization functions, i.e. proxies, in connection with a change in transport bearer characteristics and/or capabilities and the transport bearer utilization scheme. In such embodiments, the configuration portion 51 in FIG. 5 can include information indicative of which proxy or proxies, and which proxy services, should be invoked under certain conditions. The information is in some embodiments provided by either a configuration file or via the API towards applications. An example condition would be when a packet application flow carrying video is moved from a HiperLAN2 transport to a cellular bearer, according to policies. When such a condition is met, the link manager 52 can use SIMAC proxy control portion 58 to inform the SIMAC proxy or proxies, which can in turn inform affected network optimization (e.g. compressing or transcoding) proxy or proxies. In parallel, the link manager 52 can invoke optimization functions in application portion 57 in FIG. 5. The optimization function proxy can then apply its optimization function, e.g. transcoding, to adapt the streaming video application flow to fit better with the capabilities and characteristics of the cellular bearer.

FIG. 7 diagrammatically illustrates exemplary embodiments of the invention wherein the SIMAC module in the user's terminal can invoke an optimization function proxy 71 via the SIMAC proxy 32, using SIMAC proxy control portion 58, and also informing the application 75. FIG. 7A illustrates an exemplary communication protocol that the SIMAC module can use to invoke the optimization function.

The communication protocol illustrated in FIG. 7A will cause the SIMAC proxy 32 to send a message to the proxy 71, informing the proxy 71 about an 'event'. The message from the SIMAC proxy 32 to the proxy 71 also has appended thereto a "payload". This payload includes information from the communication application 75 to the proxy 71, for example which video encoding technology to apply, a reference to a particular proxy configuration which has been agreed to beforehand, or any other information causing the proxy 71 to take a specific action. The SIMAC proxy 32 does not need to know anything about the payload information that it forwards to the proxy 71. In some embodiments, the aforementioned message from the SIMAC proxy 32 to the proxy 71 will be sent when the "even criteria" is fulfilled. As mentioned above, one exemplary event criteria could be when a packet application flow carrying streaming media is moved from a HiperLAN2 transport to a cellular transport. The broken line portions of FIG. 7 represent event information flow.

Further exemplary embodiments use a further type of "proxy" to provide for efficient usage of available accesses, or transport bearers, particularly for applications 5 that are not designed for multiple access situations. Efficient utilization requires that an application flow can be identified, and that the SIMAC module has the necessary information to implement the appropriate flow mapping, and the appropriate optimization functions and access (transport) bearer configuration. In order to use the available transport bearers effectively, the application media streams (media and control in FIG. 1) should be configured in terms of IP transport and network level flows considering the (multiple) access—if application flows with different requirements as to transport capabilities and characteristics are put on the same transport and network level flow, the SIMAC may not be able to separate then from each other. If, for example, the application has put streaming audio and streaming video samples in the same application flow in terms of IP transport and network, identified by IP address and port (pairs), the SIMAC module will not be able to distinguish between the two constituent flows.

In such situations, the application should ideally inform the SIMAC module of the distinction between the two media streams, using the API, and map them onto two separate IP transport and network flows. However, if this does not occur, for example in the case of legacy applications not designed for a multiple access scenario, the distinction can be discerned implicitly. Application proxies are provided for this purpose (see also FIG. 5, portion 57). Application proxies can analyse application data from applications that cannot, or do not, themselves interact explicitly with the SIMAC module, and can then request the appropriate service from the SIMAC module. Application proxies can terminate application protocols, or look at contents, to get the required distinguishing information. This may cause a rearrangement of application data (media and control) into IP transport and network flows, but it also may serve the purpose of deducing the distinction information. In some embodiments, a profile indicating preferences can be provided to the application proxy to support the deducing procedure.

FIG. 8 diagrammatically illustrates an exemplary embodiment which utilizes an application proxy. In the FIG. 8 example, uplink HTTP traffic from a legacy browser client (not adapted for multiple access) passes an HTTP proxy (application proxy) 81. The HTTP proxy 81 analyzes the traffic and deduces the distinguishing information, for example using profile information. The profile information indicates how to map the application traffic into IP transport paths. In some embodiments, the proxy 81 can include optimization functionality such as compression.

In one example of using SIMAC, when a SIMAC module is initiated for the first time, it loads a default user policy. In some embodiments, the policy contains information about preferences of the user, and/or an external party such as a service provider or governmental body. The SIMAC module (within the user's communication terminal) discovers available SIMAC proxies in the network using, for example, the conventional techniques described above. As links may come and go, and as the capacity and/or characteristics of individual bearers on a link may change, the link manager updates its information about available transport bearer capabilities and characteristics, and makes appropriate changes in mapping of application flows onto transport channels, tunnel configuration, and configuration of IP transport level bearers (see also FIGS. 11 and 12) and link layer bearers (see also FIG. 17). The link manager also updates the layer 4 forwarding engine in the user's terminal with appropriate routing rules. The link manager also updates the layer 4 forwarding engine in the SIMAC proxy with e.g. routing rules for how to manage incoming traffic, i.e. incoming application flows. For example, all SIP packet flows addressed to the user terminal using port 5060 can be mapped onto a transport channel associated with the a UMTS interface bearer. The link manager can also provide to the layer 4 forwarding engine in the SIMAC proxy instructions about queuing (packet scheduling) which may be used in case several application flows are mapped onto the same transport channel (some application flows will then get higher priority).

The user need not participate in the actual process of re-mapping the packet application flows onto transport bearers. This can be done automatically by the SIMAC module functionality (SIMAC module 41 in FIG. 4 and SIMAC proxy 32 in FIG. 3), including managing necessary changes in the available IP layer bearers and link layer bearers.

In some embodiments, an icon indicating that SIMAC is active can be displayed in the GUI, together with information indicative of the available accesses, for example a row of LED's. The user may configure the SIMAC module with preferences, for example preferred access (per application) or how to prioritize between price and application performance.

As the user's communication terminal moves along with the user, the available (access) transport bearer capabilities and/or characteristics may change (there are of course other possible reasons for such changes, as indicated in FIG. 23). In some embodiments, information about such changes, and if applicable, possible rearrangements in e.g. the way links, or transport bearers, are used, can be displayed to the user via the GUI (or other means such as sound).

FIG. 9 illustrates an example of how transport from an application is done in a conventional IP-based system. An application has data to send and creates for this purpose a socket, identified by a port. The socket can be of different types, such as stream (TCP) or datagram (UDP). The socket is associated to a specific source IP-address, which is in turn associated to a physical link interface via a so-called device driver. The application requests transport, i.e. sending, of the application data, indicating e.g. a destination IP address. The application data will be processed by a transport level mechanism (such as TCP) associated with the socket type. The data is then forwarded to an IP module. The IP module basically uses a routing table, which indicates which outgoing link interface should be used for sending the packet in question (there are default settings which can be overruled on a per-packet basis). The actual sending is done via a device driver, which can be seen as a logical representation of a physical interface.

Historically, many link layer technologies have had only one type of bearer, a case in which no distinction need be made in selecting an interface or a bearer on an interface. However, other link layer technologies have several bearers per interface, accessed via so-called Service Access Points (SAPs). For example, a UMTS access can provide more than one bearer. These bearers differ in terms of capabilities and/or characteristics, and it is thus desirable to map an application flow with a certain set of requirements onto an appropriate bearer for those requirements.

The functionality for putting an application flow packet on a specific bearer can be located in different places. For example, the IP module may be aware of different bearers on an interface, and may be provided with, for example, two different queues in the device driver, each associated to a link layer SAP. One such queue is illustrated in FIG. 9.

Another example is when the IP module is unaware of the concept of bearers on a link interface, and the device driver has knowledge about packet flows and individual link layer bearers.

Figures 17, 18, 19:
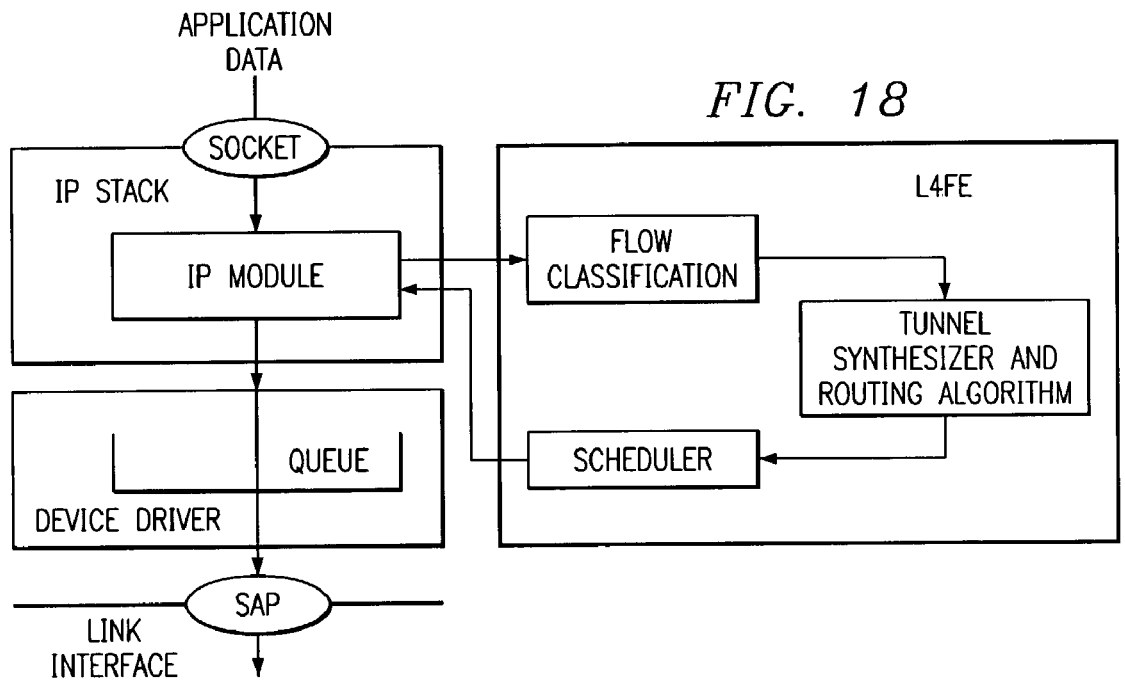
FIG. 17 illustrates an exemplary link layer bearer configuration table which can be used by the link manager of FIG. 5.
FIG. 18 illustrates exemplary interactions between a layer 4 forwarding engine according to the invention and the conventional IP functionality of FIG. 9.
FIG. 19 illustrates an exemplary table for associating transport channels with link bearers for use by the layer 4 forwarding engines of FIGS. 5 and 6.

The present invention can be realized in conjunction with either the IP stack or the driver(s). If the IP module operates as outlined in the first example above, i.e. is able to map flows onto individual bearers on the same link layer interface, the exemplary L4FE embodiment in FIG. 18 would use that IP-module capability. FIG. 18 illustrates an exemplary embodiment wherein the IP module and the device driver are assumed to be able to forward packets onto individual bearers on a link interface. Outgoing packets are forwarded from the IP module to the L4FE, where a flow classification identifies the flow to which the packet belongs. Knowing the flow, the L4FE can find out which transport channel to use, including the tunnel type, the interface and the interface bearer. FIGS. 10–12 and 19 show exemplary tables containing information used in the aforementioned process. In some cases, the original IP packet shall be tunneled, in which case a tunnel synthesizer will be invoked to perform the appropriate operation. Finally, the L4FE requests the IP module to send the IP packet using an appropriate bearer. The scheduling in the L4FE can, for example, perform the aforementioned prioritization among two or more application flows that happen to be mapped onto the same transport channel.

If the IP module is unaware of bearers on the link interface, the L4FE would interface directly with the device driver. Furthermore, if the driver does not have the capability to manage individual bearers, the Link Adapter 53 in FIG. 5 could include that functionality as well.

It can be seen from the above-described exemplary embodiments that the SIMAC module overrides the user plane functionality to an extent that depends on e.g. how advanced the IP module is.

As mentioned above, FIGS. 10–12 and 19 illustrate exemplary tables which can be used by the layer 4 forwarding engines 54 (see FIG. 5) and 61 (see FIG. 6) according to the invention. As discussed above, the link manager 52 can set and maintain (i.e. update) the content of the routing tables in the layer 4 forwarding engines 54 and 61. The packets of different packet flows can be identified using a table such as illustrated in FIG. 10. As shown in FIG. 10, the identities of various application flows can be determined, for example, using any desired combination of information conventionally found in the IP network and/or transport headers.

When a given packet has been identified to belong to its corresponding application flow using, for example, the table in FIG. 10, the packet flow identity can then be used in conjunction with the table of FIG. 11 to determine transport channel on which the packet should be transported. As shown in FIG. 11, a given packet can be associated with one or more transport channels. If a given packet flow is associated with more than one transport channel, these transport channels can be prioritized in order of desirability. For example, FIG. 11 illustrates a first priority downlink transport channel, and a second priority downlink transport channel. The prioritized set of transport channels provides flexibility in that, for example, a lower priority transport channel can be used if a higher priority transport channel is unavailable, for example due to channel overload. The latter can be the result for example when a link layer transport bearer is overloaded. A transport channel can be, for example, a "raw" IP bearer, or a tunnel wherein, for example, the user application IP SDU is encapsulated. Several exemplary encapsulation techniques are available, including but not limited to, IP in IP, or IP in UDP. In some embodiments, the tunnel encapsulation can include operations such as compression and/or encryption of the encapsulation header. The above-described exemplary characteristics of a given transport channel are illustrated in the exemplary table of FIG. 12.

As mentioned previously, an application flow will be associated to a transport channel, which then can be of different types. The transport channel is associated to a link layer transport service, a bearer, accessed via a SAP in the link interface, and in some embodiments available via a specific queue in a device driver associated to the link layer bearer. FIG. 19 illustrates an exemplary table associating a transport channel to an interface and implicitly to a bearer via a specific queue in the driver.

Taking FIGS. 10–12 together, an incoming packet is associated with a packet application flow using the table of FIG. 10. The packet flow identity is used in the table of FIG. 11 to determine the transport channel on which the packet should be transported, and the selected transport channel is specified by the table of FIG. 12. The transport channel is then associated with an individual bearer as exemplified by the table of FIG. 19.

Figure 13:
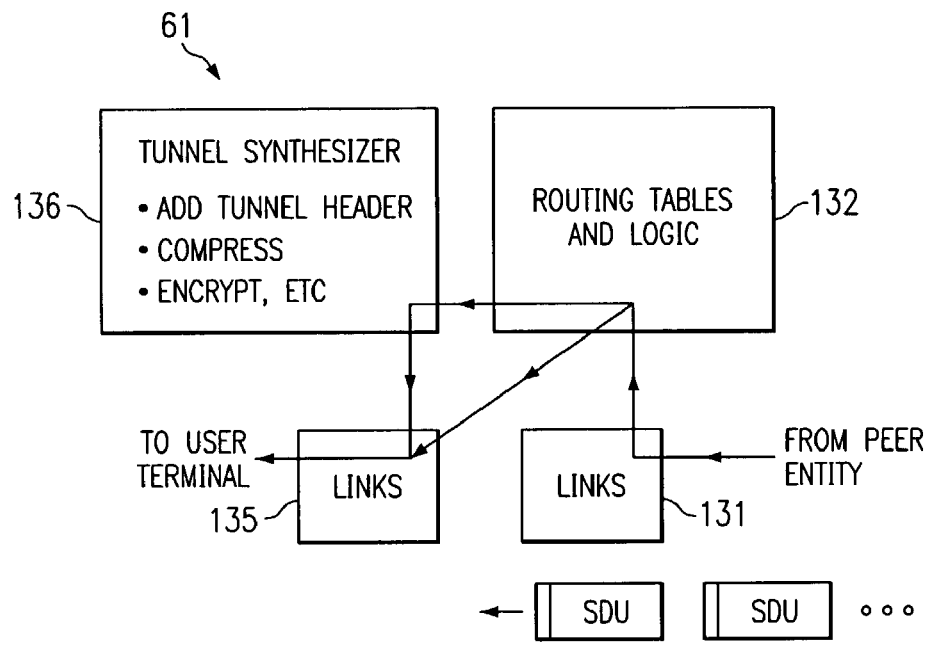
FIG. 13 diagrammatically illustrates a portion of FIG. 6 in greater detail.

FIG. 13 diagrammatically illustrates pertinent portions of exemplary embodiments of the layer 4 forwarding engine 61 of FIG. 6. In FIG. 13, the incoming packet flow from an incoming communication link at 131 is input to a portion 132 which includes routing tables (such as shown at FIGS. 10–12) and logic for: identifying the packet flow with which each incoming packet is associated (FIG. 10); using the packet flow identity to identify the transport channel which is to be used for the packet (FIG. 11); and routing the packet to the appropriate link at 135, which link is associated with the selected transport channel (FIG. 12). In embodiments which utilize tunneling techniques, some transport channels can specify tunneling functionality. In such embodiments, a tunnel synthesizer such as illustrated at 136 can be provided, and the portion 132 can forward to the tunnel synthesizer the packets of those packet flows whose associated transport channels specify tunneling functionality. In such embodiments, each packet to which tunneling has been applied is directed from the tunnel synthesizer 136 to a link at 135 associated with the selected transport channel, and those packets to which tunneling is not applied are forwarded from the portion 132 directly to the appropriate link at 135. Examples of the links at 135 include UMTS, Bluetooth, LAN, WLAN, GPRS and Ethernet.

Still referring to FIG. 13, for communications directed to the peer entity (see also 33 in FIG. 3), the layer 4 forwarding engine 61 would perform generally the inverse of the exemplary routing operations described above with respect to FIG. 13.

The SIMAC routing functionality associated with the user equipment (e.g. a layer 4 forwarding engine 54 as shown in FIG. 5, either collocated with the user equipment as in FIG. 4 or provided in a SIMAC proxy separate from the user equipment as in FIG. 2) can perform generally the same exemplary routing operations described above relative to FIG. 13. Of course, in embodiments where the layer 4 forwarding engine is collocated with the user equipment, communications are routed between the link interfaces and the user applications rather than from input link interfaces to output link interfaces.

Embodiments without proxies are also recognised as being alternative embodiments, e.g. when each user's equipment has a SIMAC module. Also, the functionality in the SIMAC proxy 32 of FIG. 3 can be realized in link layer or network layer entities, exemplified by but not limited to UMTS nodes, SGSN and GGSN, or routers.

As has been mentioned before, the Link manager 52 in FIG. 5 controls the Layer 4 forwarding engines. The Link manager provides the information used in the Layer 4 forwarding engine routing tables to forward packets onto tunnels or directly onto transport bearers via the device driver. In some exemplary embodiments, the Link manager configures link layer functions via Link Adapters 53 in FIG. 5, as exemplified by FIG. 17. In some exemplary embodiments, the Link manager interacts with applications via API's, and/or via configuration data, exemplified by portions 143 and 141 in FIG. 14. The Link manager interacts with links via Link Adapters 53, and the L4FE can interact with links via an IP module and/or device drivers as shown in FIG. 18. In some exemplary embodiments, the Link manager is capable of implicitly deducing the availability and capability and/or characteristics of an interface and, in relevant cases, individual bearers, and can, as a consequence (if necessary), trigger the procedure of adapting the flow-mapping, etc, accordingly. Some embodiments of the Link manager may also include configuration of IP transport and network level functions, such as but not limited to, RSVP and Mobile IP. In doing this, in some embodiments the information in FIGS. 10–12 and 19 is used. The Link manager is also responsible for informing application(s) about certain events (as requested by user or application), such as a change in the availability of interfaces or in the capabilities or characteristics of a transport bearer, e.g. a UMTS bearer.

In some embodiments, the Link Manager interacts with links to configure them, or their individual bearers. This interaction can in some embodiments be done via the link adapters, but in other embodiments, the Link Manager can interact directly with the link interfaces. In configuring the links, or bearers on a link, the link manager provides the information necessary for obtaining link service. Depending on the type of link layer technology, the information needed, and the way the interaction is done, varies. In some embodiments, the link manager provides information about, for example, required bandwidth (see FIG. 17), minimum delay, whether compression shall be done or not, etc.

Figure 20:
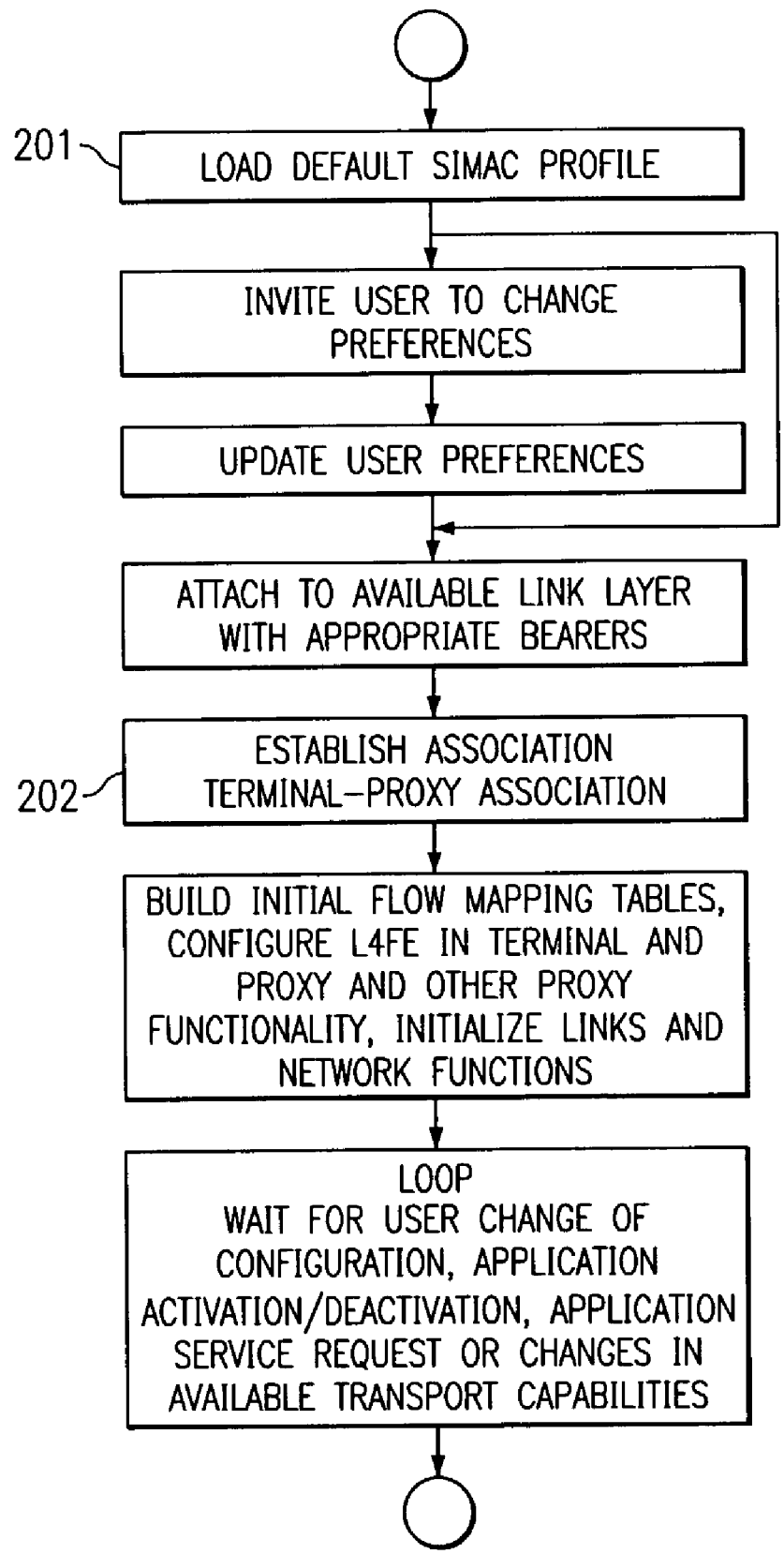
FIG. 20 illustrates exemplary SIMAC initialization operations according to the invention.
Figure 21:
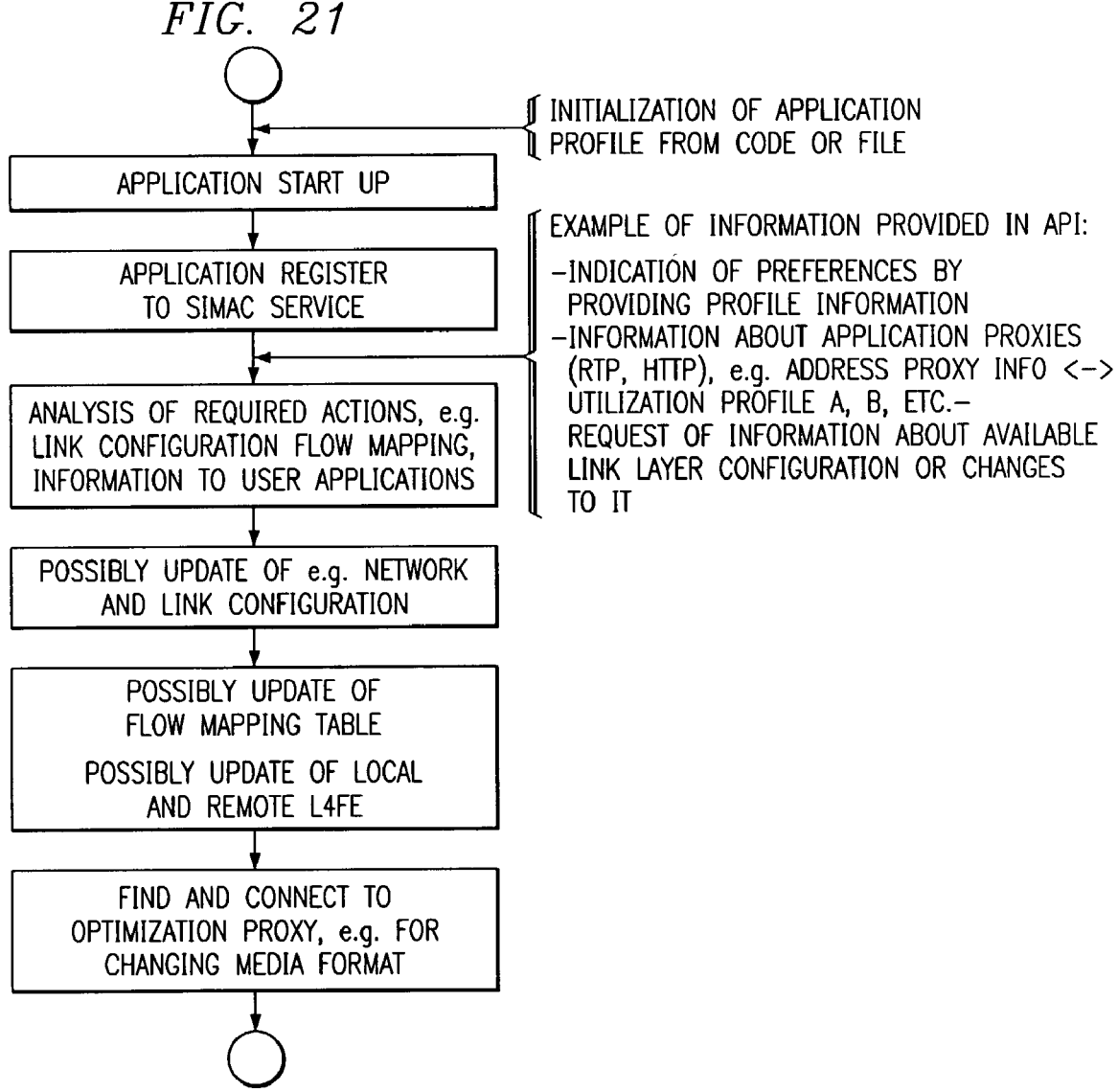
FIG. 21 illustrates exemplary operations for registration of an application with SIMAC service according to the invention.
Figure 22:
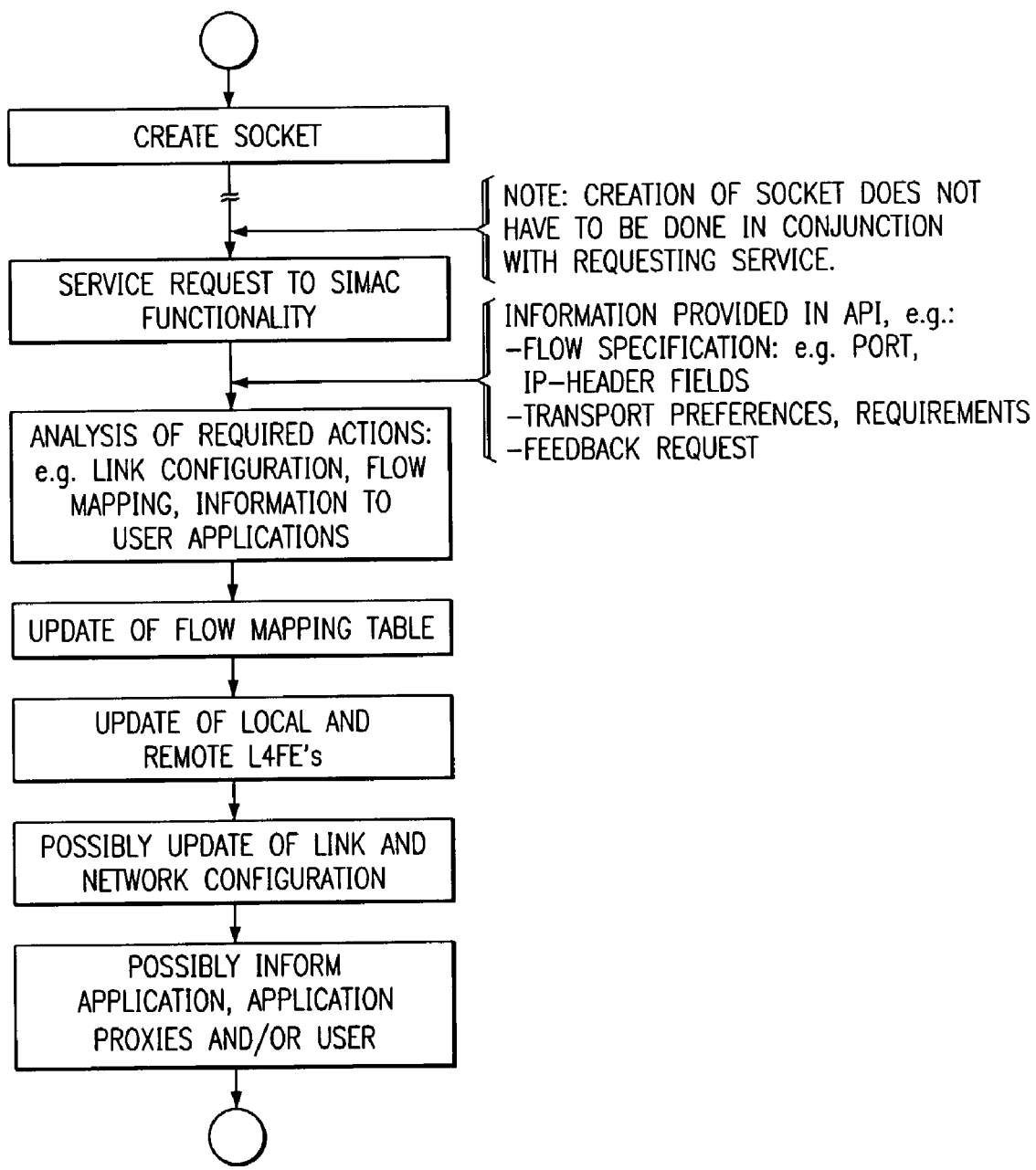
FIG. 22 illustrates exemplary operations associated with an application service request according to the invention.

FIGS. 20–23 include flow diagrams describing exemplary operations of the Link Manager 52, including SIMAC initialization in FIG. 20, registration of an application with SIMAC service in FIG. 21, an application service request in FIG. 22, and flow re-mapping in FIG. 23.

Figure 14:
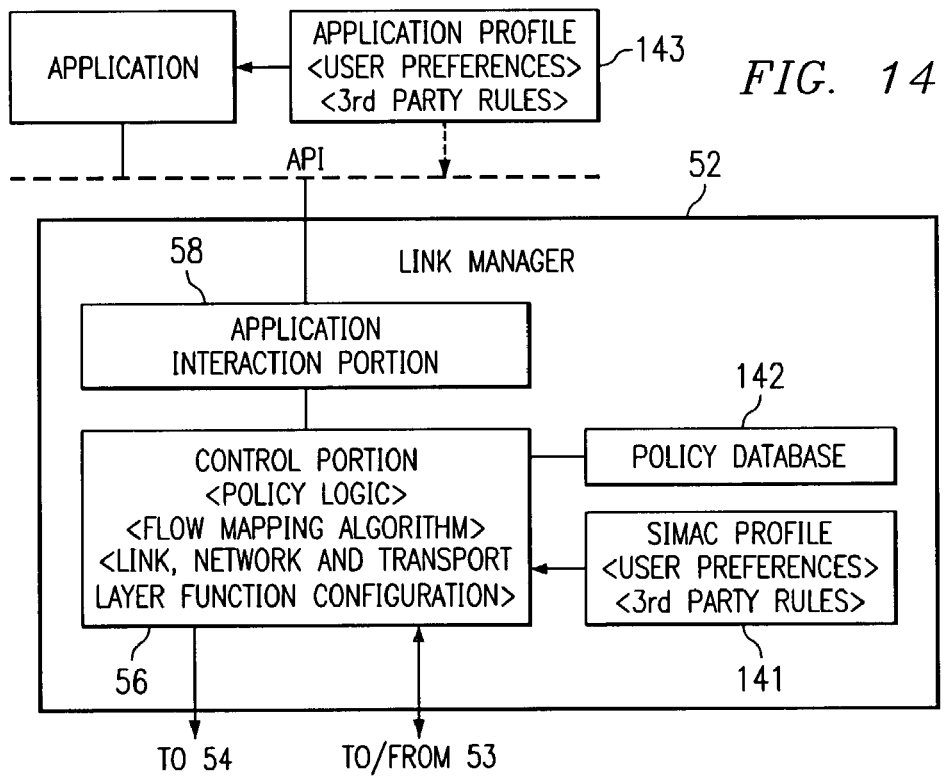
FIG. 14 diagrammatically illustrates pertinent portions of exemplary embodiments of the link manager of FIG. 5.

FIG. 14 diagrammatically illustrates pertinent portions of further exemplary embodiments of a Link manager according to the invention. The arrangement of FIG. 14 is operable for performing the control plane process of assigning an output interface and, if applicable, an appropriate bearer on a link, to each application flow (for example the incoming packets received at links 131 of FIG. 13 or from the IP module in FIG. 18), and for performing other related functions such as tunneling, etc, as described previously.

In some embodiments, a user may express preferences about how an individual application (see profile 143 in FIG. 14) and/or the SIMAC functionality (see profile 141 of FIG. 14) as a whole should operate. For each profile 141 and 143, there may in some embodiment exist an external party, called 3$^{rd}$ party herein, that are setting 'rules', delimiters for the operation of said functionality. The profiles are processed by policy logic in the central control portion 56 (see also FIG. 14 and FIG. 5) to produce a policy file that is stored in a policy database 142 of FIG. 14.

Figure 16:
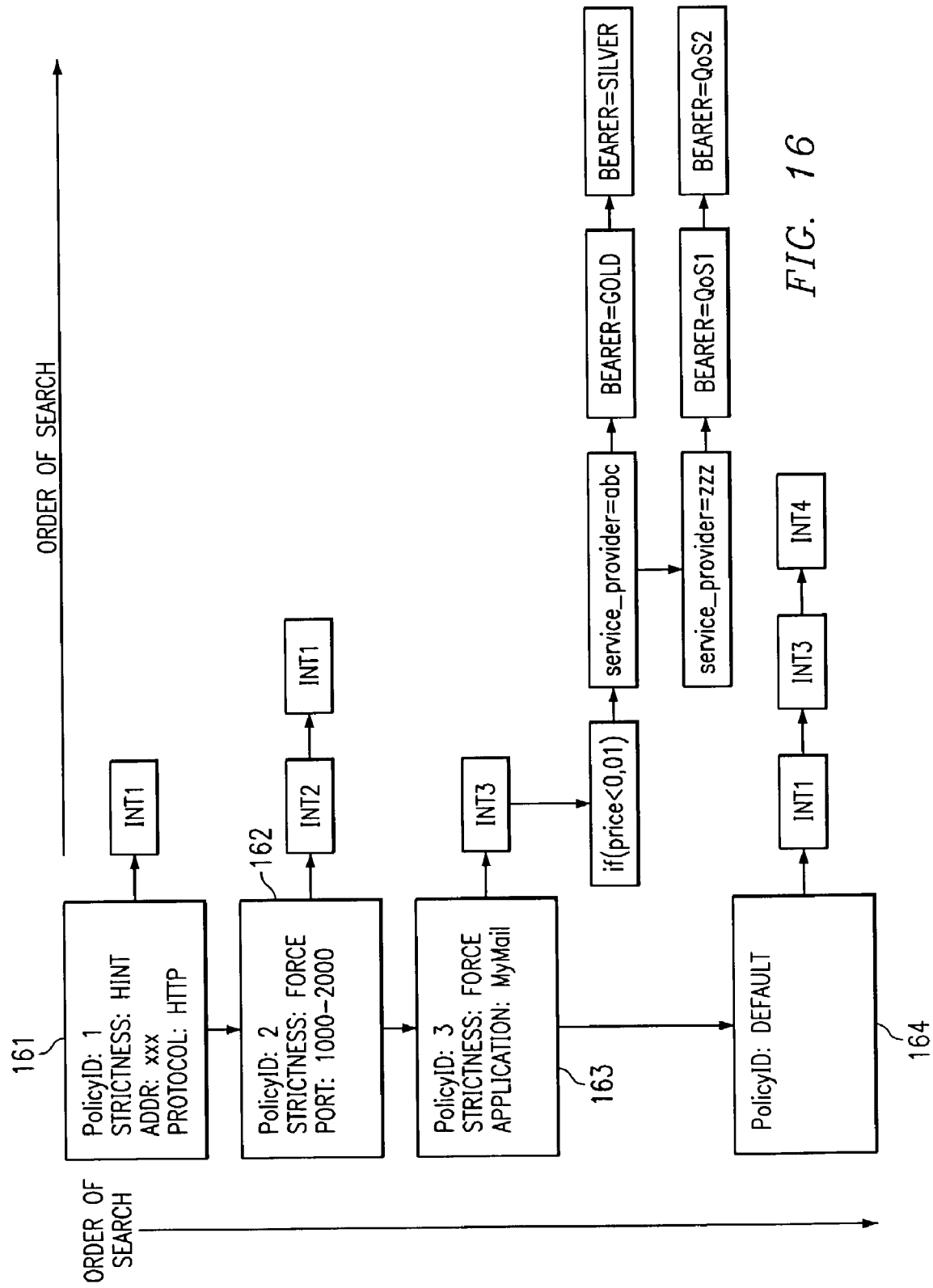
FIG. 16 illustrates an exemplary policy file which can be used by the embodiments of FIG. 14.

FIG. 16 illustrates an exemplary policy file according to the invention, including four policies arranged in priority order from the highest priority policy 161 progressively through the next highest priority policy 162, the next highest priority policy 163, and the lowest priority policy 164 which is, in this example, a default policy. The flow-mapping functionality in the control portion 56 of FIGS. 5 and 14 can use this policy file when processing a request to configure the SIMAC functionality for a new application flow. Referring specifically to the highest priority policy 161, if the address and protocol parameters therein match the corresponding parameters in the application flow, and if the information about available accesses allows, then interface INT1 is used, that is the flow mapping functionality in the control portion 56 of the Link manager will select the transport channel accordingly, and update the routing table in the Layer 4 forwarding engine 54. Note that in this case INT1 is the type of interface with only one bearer, which is the reason why it is sufficient to check whether the interface is available or not. In case of a link layer technology with several bearers, the policy will concern not only the availability of the interface as such but rather individual bearers (including considering their capabilities and/or characteristics status). If INT1 is not available, then the next highest priority policy, namely policy 162, is examined. Note too that the strictness parameter in the policy 161 is used to determine whether any other policies in the policy file can be examined. Because the value of the strictness parameter is "hint", examination of the next highest priority policy is permitted. However, if the strictness parameter is set to "force", then this would mean, in this example, that no interface other than INT1 need be examined, because no other interface is allowed for the application flow. In such a case, the Link Manager can reject the application service request with a relevant fault code.

Referring to policy 162, if the flow identity parameters in the application flow indicate that the packet is going to a port whose number is within the range 1000–2000, then interface INT2 can be examined for availability. If interface INT2 is not available, then INT1 is examined for availability. In one example, interface INT2 represents all WLAN interfaces, so that all WLAN interfaces are examined if the application flow has a flow identity parameter port number in the range of 1000–2000. However, if none of the WLAN interfaces are available, then interface INT1 is examined for availability. If none of the interfaces defined in policy 162 are available, a service request failure has occurred, because the strictness parameter in policy 162 is "force", so no other interface is allowed for the application flow. The Link Manager can respond to the request with a 'service failure' indication.

Assuming for purposes of exposition that the strictness parameter in policy 162 is "hint", and further assuming that none of the interfaces defined in policy 162 are available, then policy 163 can be examined. If the prices per unit time parameter of the packet is less or equal to 0.01 eur/s, then interface INT3 (e.g., UMTS) is examined for availability. If INT3 is available, then this exemplary policy calls for examination of two different service providers arranged in priority order from the higher priority "abc" to the lower priority "zzz". If the higher priority service provider, in this case "abc" is available, then this exemplary policy calls for examination of two different bearers arranged in priority order, from the higher priority to the lower. If the higher priority bearer, in this case "gold" is available, then it is to be used by the flow mapping functionality in the control portion 56 of the Link manager to select the transport channel accordingly. If the higher priority bearer is not available, then the lower priority bearer (e.g. "silver") is checked for availability. If no service providers or bearers listed in the policy 163 are available, the strictness parameter set to "force" indicates that the next priority policy 164 need not be checked. If the strictness parameter is set to "hint", then any other available service provider or bearer can be used. Although exemplary policy 163 includes only two service providers, each with two associated bearers, any number of service providers and any number of associated bearers can be specified in a policy according to the invention.

In some other exemplary policy files, service providers might not be specified. Instead, an interface may be directly associated with one or more bearers. In some exemplary policy files, there may be only an interface specified, no service providers or bearers at all.

If interface INT3 (as specified by policy 163) is unavailable, then the default policy 164 is examined to determine first whether INT1 is available, and if not, to determine whether INT3 or INT4 is available, in that order. It should be clear that the interfaces in each policy of FIG. 16 are prioritized from the highest priority on the left, sequentially downward in priority to lowest priority on the right.

In another exemplary embodiment, the policy 163 could be designed such that, if the price per unit time parameter of the packet is less than or equal to the value shown in policy 163, the policy logic in the control portion 56 is referred to a separate data structure (provided, for example, in link manager 52) which maintains an updated list of the prices (costs) of the bearers associated with the various interfaces. The prices can be provided to the link manager 52, for example, by associated access routers or link layer entities for UMTS such as GGSN. From the price list, the policy logic in the control portion 56 in the link manager 52 can, for example, select for examination the interface, or bearer, which currently provides the lowest cost packet transport service. If the interface that provides the lowest cost packet transport service is not available, then the interface that provides the next lowest cost packet transport service can be examined for availability, and applicability, and so on until an available interface, and applicable bearer, is identified, or a transport service request failure has occurred.

Examples of interfaces INT1, INT2, INT3 and INT4 include UMTS, Bluetooth, LAN, WLAN, GPRS and Ethernet.

Figure 15:
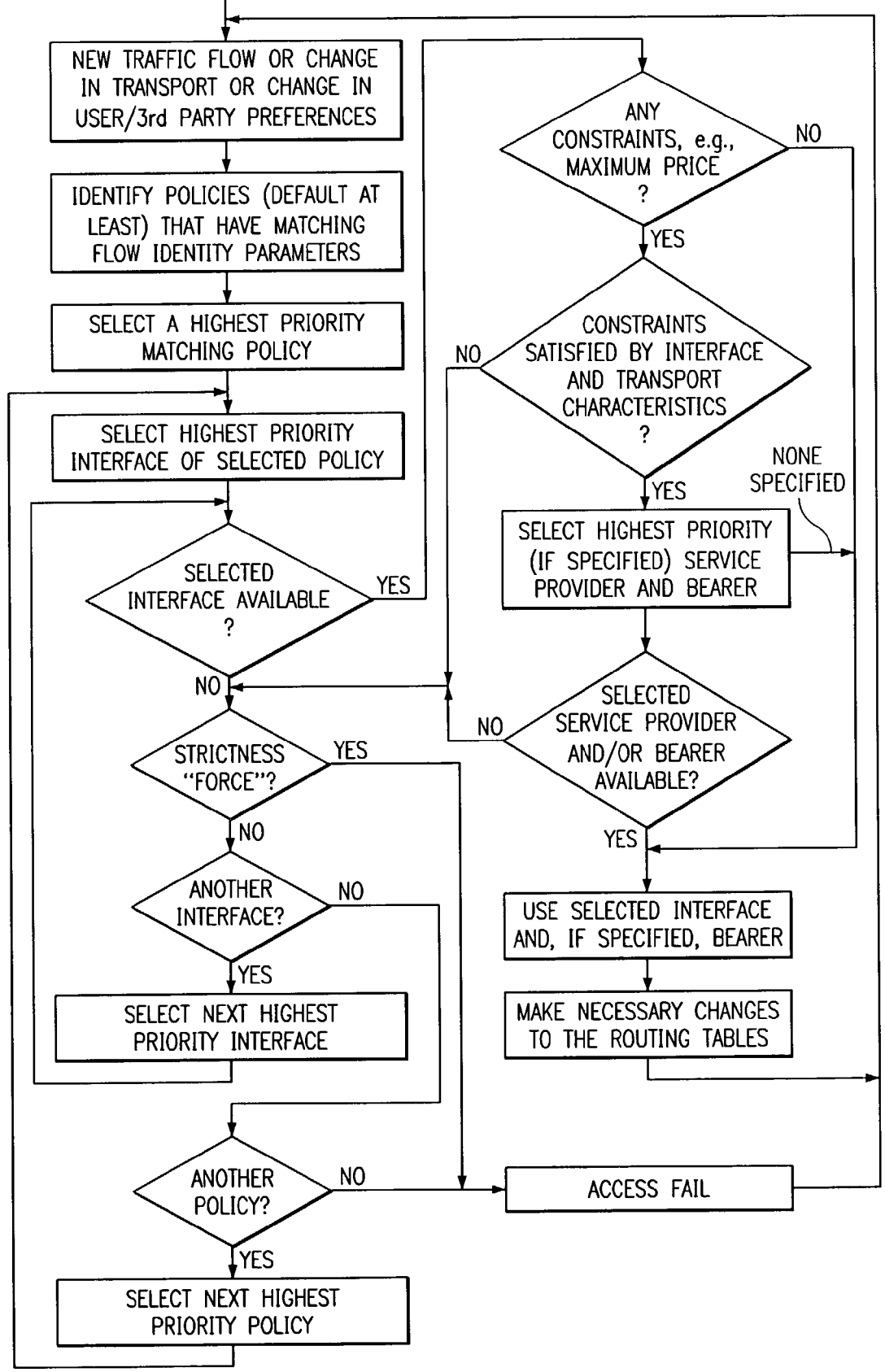
FIG. 15 illustrates exemplary operations which can be performed by the embodiments of FIG. 14.

FIG. 15 illustrates the flow, according to the invention, to check the conformance of routing of flows to different interfaces and bearers. The FIG. 15 flow can be initiated for a new traffic flow or, for example, when there is a change in the interface or transport characteristics (e.g., a price change), when an available interface or bearer becomes unavailable, when a new interface or bearer becomes available, or when a change in user or third party preferences occurs. The exemplary operations shown in FIG. 15 have been described above, and can be performed by the policy logic in control portion 56 of link manager 52.

As a specific example of operations supported by the invention, assume that a user initiates a conversational application including two media flows, an audio speech flow and a still image flow, together with their associated signaling flows. Assume that the user has a mobile communication terminal with a Bluetooth2Lan interface, a HiperLan2 (H2) interface and a UMTS interface. Assume that two applications are running, for example a web browser and a conversational communication manager for peer-to-peer communication.

If the user happens to be in her office, in which Bluetooth2Lan, H2 and UMTS network accesses are available, the SIMAC module could be configured as follows: all HTTP traffic onto the Bluetooth2LAN access; SIP/SDP onto the UMTS access; and all other traffic (i.e. default) onto the Bluetooth2LAN access. The user initiates an audio session to a second user using IETF protocols SIP and SDP. The resulting SIP/SDP exchange between the user equipments is carried on the UMTS access. The user also decides to map the speech media flow, carried in RTP packets, onto the UMTS bearer. One reason for the aforementioned mapping onto UMTS is that the user may not wish for the session signaling and the associated speech media flow to be interrupted as she moves around. A cellular access such as UMTS is designed for such purposes.

During the call, if the first (initiating) user wishes to share a set of images with the second user, the first user can use the web browser to access the images from a server in the network. These images are fetched to the first user's communication terminal using the Bluetooth2LAN access in accordance with the routing profile in the configuration portion of the SIMAC module.

The HTTP URL of one of the fetched images is signaled to the second user over the Bluetooth2LAN access, together with a request to (1) add an image media flow to the session and (2) establish an image manipulation protocol between the terminals of the two users. When the second user accepts the request, he fetches the image from the server. Each of the two users now has the image for manipulation. As they manipulate the image, information about this manipulation is signaled between the two terminals. The UMTS access is used for this image manipulation signaling, in conformance with the routing profile in the configuration portion of the SIMAC module. Thus, the current state of the session (e.g. for terminal 31 and proxy 32) is as follows: all HTTP including image download traffic is routed onto the Bluetooth2LAN access; image manipulation and SIP/SDP is routed onto the UMTS access; audio and associated signaling flows are routed onto the UMTS access; and all other flows are routed onto the Bluetooth2LAN (default) access.

If the first user now moves out of her office and out of Bluetooth range, the SIMAC module can implement the following routing profile: all HTTP including image download traffic onto the H2 access; image manipulation and SIP/SDP onto the UMTS access; audio and associated signaling flows onto the UMTS access; and all other flows onto the H2 access (now the default access). Thus, the SIMAC module manages the situation by mapping moving image flows onto the H2 access and providing the user (and optionally also the application(s)) with a notification regarding the change in available bearers. The audio media flow and its associated signaling (for example, RTCP) is not affected because the UMTS access remains available.

If the first user wishes to look at another image, that image can be downloaded to the first user's communication terminal using the H2 access. If the first user moves out of range of the H2 access as well, then the SIMAC module (and/or the user) can choose to use UMTS for the HTTP traffic as well.

It will be evident to workers in the art that the above-described embodiments can be readily implemented, for example, by suitable modifications in software, hardware, or a combination of software and hardware, in conventional communication terminals and proxy devices.

Although exemplary embodiments of the invention are described above in detail, this does not limit the scope of the invention, which can be practiced in a variety of embodiments.

What is claimed is:

1. A method of conducting a communication session via an IP-based communication network, comprising:
    obtaining access to the communication network via a plurality of bearers;
    simultaneously routing a plurality of packet flows produced by one or more communication applications via the plurality of bearers each bearer having respective transport capabilities that differ from one another, for at least one of the plurality of packet flows, based on link layer information, selecting one of the plurality of bearers according to one of a user preference, a requirement of the one or more communication applications and a third party preference;
    changing the routing of the at least one of the plurality of packet flows from a current bearer to a different bearer, and
    informing the user, the one or more communication applications or the third party about the routing change.

2. The method of claim 1, including encapsulating the packets of one of said packet flows for tunneling on an associated bearer.

3. The method of claim 1, including configuring one of the plurality of bearers based on a characteristic of the associated packet flow.

4. The method of claim 1, wherein at least two of the plurality of bearers are provided by a single network link interface.

5. The method of claim 1, including selecting the plurality of bearers based on link layer information indicative of bearer availability.

6. The method of claim 1, wherein said link layer information indicates that the current bearer will become unavailable for routing of the one packet flow, and wherein said unavailability results from movement of a communication terminal on which the communication application is running.

7. The method of claim 1, including selecting one of the the plurality of bearers bearers based on one of a user preference, a requirement of the communication application, and a third party preference with respect to packet flow routing.

8. The method of claim 1, including selecting one of the plurality of bearers based on a characteristic of the associated packet flow and an operational characteristic of said one bearer.

9. The method of claim 8, wherein the packet flow characteristic includes one of a bandwidth requirement and an information content of the packets in the packet flow.

10. The method of claim 8, wherein the packet flow characteristic includes one of a quality of service requirement and an information content of the packets in the packet flow.

11. The method of claim 8, wherein the operational characteristic includes one of throughput and cost of operation.

12. The method of claim 8, wherein the operational characteristic includes a quality of service parameter.

13. The method of claim 1, including applying a performance enhancing function to one of the packet flows based on a characteristic of the one packet flow.

14. The method of claim 13, wherein the packet flow characteristic is a bandwidth requirement.

15. The method of claim 13, wherein said applying step includes a proxy in the network applying the performance enhancing function.

16. The method of claim 13, wherein said applying step includes applying a transcoder function.

17. The method of claim 1, including the communication application providing in a single data path a first constituent packet flow whose packets carry a first type of signaling and a second constituent packet flow whose packets carry a second type of signaling that is different from said first type of signaling, distinguishing the first constituent packet flow from the second constituent packet flow, and routing the first and second constituent packet flows respectively on first and second bearers.

18. The method of claim 17, wherein said distinguishing step includes an application proxy distinguishing the first constituent packet flow from the second constituent packet flow.

19. The method of claim 1, wherein the step of obtaining access includes obtaining access to a bearer associated with one of a Bluetooth interface, a LAN interface, a WLAN interface, a UMTS interface, a GPRS interface, an Ethernet interface, and a HiperLAN2 interface.

20. The method of claim 1, wherein the packet flows are uplink packet flows.

21. The method of claim 1, wherein the packet flows are downlink packet flows.

22. The method of claim 1, wherein the plurality of bearers are provided by respective network link interfaces.

23. The method of claim 22, including determining whether first connection information associated with one of the packet flows matches second connection information associated with a first network link interface.

24. The method of claim 23, including, if the first connection information matches the second connection information, determining whether the first network link interface is available for routing the packet flow and, if so, said routing step including routing the packet on the first network link interface.

25. The method of claim 24, including if the first network link interface is not available, determining whether a second network link interface associated with the second connection information is available for routing the packet flow and, if so, said routing step including routing the packet flow on the second network link interface.

26. The method of claim 25, including, if the second network link interface is not available, determining whether the first connection information matches third connection information associated with a third network link interface.

27. The method of claim 26, including, if the first connection information matches the third connection information, determining whether the third network link interface is available for routing the packet flow and, if so, said routing step including routing the packet flow on the third network link interface.

28. The method of claim 27, wherein the first and second network link interfaces are different from one another.

29. The method of claim 28, wherein the third network link interface is different from both of the first and second network link interfaces.

30. The method of claim 28, wherein the third network link interface is the same as one of the first and second network link interfaces.

31. The method of claim 26, wherein the third connection information is defined to ensure that the first connection information will match the third connection information.

32. The method of claim 23, including, if the first connection information does not match the second connection information, determining whether the first connection information matches third connection information associated with a second network link interface.

33. The method of claim 32, including, if the first connection information matches the third connection information, determining whether the second network link interface is available for routing the packet flow and, if so, said routing step including routing the packet flow on the second network link interface.

34. The method of claim 33, including, if the second network link interface is not available, determining whether a third network link interface associated with the third connection information is available for routing the packet flow and, if so, said routing step including routing the packet flow on the third network link interface.

35. The method of claim 23, wherein the first connection information includes one of an IPv4/v6 address, a port number, a communication protocol identifier, a host identity tag, and a local scope identifier.

36. The method of claim 23, wherein the second connection information includes one of an IPv4/v6, a port number, a communication protocol identifier, a host identity tag, and a local scope identifier.

37. The method of claim 23, wherein the first connection information is contained in headers of the packet flow.

38. The method of claim 23, wherein the second connection information specifies a range for a connection parameter included within the first connection information, and wherein said determining step includes determining whether the connection parameter of the first connection information is within the range specified by the second connection information.

39. The method of claim 38, wherein the connection parameter is a port number.

40. The method of claim 23, wherein said determining step includes determining whether the first connection information includes the second connection information.

41. The method of claim 40, wherein the second connection information is an IP address and a communication protocol identifier.

42. The method of claim 23, wherein the second connection information is associated with a group of network link interfaces, and including, if the first connection information matches the second connection information choosing to route the packet flow on one of the group of bearers based on the relative costs of using the respective bearers of the group for routing the packet flow.

43. The method of claim 42, wherein the one bearer has the lowest cost.

44. An apparatus for use in conducting a communication session via an IP-based communication network, comprising:
a network link interface structure for providing access to a plurality of bearers which in turn provide access to the communication network;
a communication path for carrying a plurality of packet flows produced by a communication application; and
a routing apparatus coupled to said network link interface structure and said communication path for permitting the plurality of packet flows produced by one or more communication applications be routed simultaneously via the plurality of bearers each bearer having respective transport capabilities that differ from one another wherein, for at least one of the plurality of packet flows, based on link layer information, the routing apparatus comprising means for:
selecting one of the plurality of bearers according to one of a user preference, a reguirement of the one or more communication applications and a third party preference;
changing the routing of the at least one of the plurality of packet flows from a current bearer to a different bearer, and
informing the user, the one or more communication applications or the third party about the routing change.

45. The apparatus of claim 44, wherein said routing apparatus includes a tunnel synthesizer for encapsulating the packets of one of said packet flows for tunneling on the associated bearer.

46. The apparatus of claim 44, wherein the plurality of bearers are provided by respective network link interfaces included in said network link interface structure.

47. The apparatus of claim 44, wherein at least two of the plurality of bearers are provided by a single network link interface included in said network link interface structure.

48. The apparatus of claim 44, wherein said network link interface structure includes one of a Bluetooth interface, a LAN interface, a WLAN interface, a UMTS interface, a GPRS interface, an Ethernet interface, and a HiperLAN2 interface.

49. The apparatus of claim 44, provided as a user's communication terminal.

50. The apparatus of claim 49, wherein said communication terminal is a wireless telecommunications terminal.

51. The apparatus of claim 44, provided as a proxy in the network.

52. The apparatus of claim 44, wherein the packet flows are uplink packet flows.

53. The apparatus of claim 44, wherein the packet flows are downlink packet flows.

54. The apparatus of claim 44, including a link manager coupled to said routing apparatus for deciding how the packet flows are to be routed on said bearers and for providing information indicative of the decided routing to said routing apparatus.

55. The apparatus of claim 44, wherein said link manager is located remotely from said routing apparatus.

56. The apparatus of claim 54, wherein said link manager is collocated with said routing apparatus.

57. The apparatus of claim 54, including an interface coupled to said link manager for permitting one of a user, the communication application and a third party to input to said link manager information indicative of desired routing of said packet flows, said link manager responsive to said desired routing information for deciding said routing of the packet flows.

58. The apparatus of claim 54, wherein the plurality of bearers are provided by respective network link interfaces included in said network link interface structure.

59. The apparatus of claim 58, wherein said link manager includes logic having a first input for receiving first connection information associated with one of the packet flows, and a second input for receiving second connection information and network link interface information indicative of a first network link interface associated with the second connection information, said logic operable for determining whether the first connection information matches the second connection information.

60. The apparatus of claim 59, wherein said logic includes a third input for receiving information indicative of network link interface availability, said logic responsive to a determination that the first connection information matches the second connection information for determining from the network link interface availability information whether the first network link interface is available for routing the packet flow, said routing apparatus operable for routing the packet flow on the first network link interface in response to a determination that the first network link interface is available.

61. The apparatus of claim 60, wherein said network link interface information includes information indicative of a second network link interface associated with the second connection information, said logic operable in response to a determination that the first network link interface is not available for determining whether the second network link interface is available, said routing apparatus operable for routing the packet flow on the second network link interface in response to a determination that the second network link interface is available.

62. The apparatus of claim 61, wherein said second input is further for receiving third connection information and further network link interface information indicative of a third network link interface associated with the third connection information, said logic operable in response to a determination that the second network link interface is not available for determining whether the first connection information matches the third connection information.

63. The apparatus of claim 62, wherein said logic is responsive to a determination that the first connection information matches the third connection information for determining whether the third network link interface is available for routing the packet flow, said routing apparatus operable for routing the packet flow on the third network link interface in response to a determination that the third network link interface is available.

64. The apparatus of claim 59 wherein said second input is further for receiving third connection information and further network link interface information indicative of a second network link interface associated with the third connection information, said logic operable in response to a determination that the first connection information does not match the second connection information for determining whether the first connection information matches the third connection information.

65. The apparatus of claim 64, wherein said logic is responsive to a determination that the first connection information matches the third connection information for determining whether the second network link interface is available for routing the packet flow, said routing apparatus operable for routing the packet flow on the second network link interface in response to a determination that the second network link interface is available.

66. The apparatus of claim 65, wherein the further network link interface information includes information indicative of a third network link interface associated with the third connection information, said logic operable in response to a determination that the second network link interface is not available for determining whether the third network link interface is available for routing the packet flow, said routing apparatus operable for routing the packet flow on the third network link interface in response to a determination that the third network link interface is available.

* * * * *

UNITED STATES PATENT AND TRADEMARK OFFICE
CERTIFICATE OF CORRECTION

PATENT NO. : 7,230,921 B2 Page 1 of 1
APPLICATION NO. : 10/106861
DATED : June 12, 2007
INVENTOR(S) : Goran A. P. Eriksson et al.

It is certified that error appears in the above-identified patent and that said Letters Patent is hereby corrected as shown below:

In Column 11, Line 3, after "applications" delete "5".

In Column 19, Lines 42-43, in Claim 7, after "of the" delete "the".

In Column 19, Line 43, in Claim 7, delete "bearers" before "based".

In Column 21, Line 23, in Claim 36, delete "IPv4/v6," and insert -- IPv4/v6 address, --, therefor.

In Column 22, Line 5, in Claim 44, delete "reguirement" and insert -- requirement --, therefor.

Signed and Sealed this

Tenth Day of June, 2008

JON W. DUDAS
*Director of the United States Patent and Trademark Office*